(12) United States Patent
Wakai et al.

(10) Patent No.: US 10,687,052 B2
(45) Date of Patent: Jun. 16, 2020

(54) CAMERA PARAMETER CALCULATION METHOD, RECORDING MEDIUM, CAMERA PARAMETER CALCULATION APPARATUS, AND CAMERA PARAMETER CALCULATION SYSTEM

(71) Applicant: Panasonic Intellectual Property Management Co., Ltd., Osaka (JP)

(72) Inventors: Nobuhiko Wakai, Osaka (JP); Takeo Azuma, Kyoto (JP); Kunio Nobori, Osaka (JP); Satoshi Sato, Kyoto (JP); Mikiya Nakata, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/961,026

(22) Filed: Apr. 24, 2018

(65) Prior Publication Data
US 2018/0316912 A1 Nov. 1, 2018

(30) Foreign Application Priority Data
May 1, 2017 (JP) .................................. 2017-091109

(51) Int. Cl.
*H04N 7/18* (2006.01)
*H04N 17/00* (2006.01)
(Continued)

(52) U.S. Cl.
CPC ............ *H04N 17/002* (2013.01); *G06T 7/85* (2017.01); *H04N 7/18* (2013.01); *H04N 13/239* (2018.05);
(Continued)

(58) Field of Classification Search
CPC .... H04N 5/232; H04N 5/23238; H04N 17/00; H04N 17/002; H04N 13/246;
(Continued)

(56) References Cited

U.S. PATENT DOCUMENTS 6,813,371 B2* 11/2004 Kakinami ............... G01S 11/12
382/104
8,842,181 B2* 9/2014 Kosaki ..................... H04N 7/18
348/148

(Continued)

FOREIGN PATENT DOCUMENTS

JP  2006-148745  6/2006
JP  2009-121824  6/2009
(Continued)

OTHER PUBLICATIONS

Roger Y. Tsai, "A Versatile Camera Calibration Technique for High-Accuracy 3D Machine Vision Metrology Using Off-the-Shelf TV Cameras and Lenses", IEEE Journal of Robotics and Automation, vol. RA-3, No. 4, Aug. 4, 1987, pp. 323-344.
(Continued)

*Primary Examiner* — Trang U Tran
(74) *Attorney, Agent, or Firm* — Wenderoth, Lind & Ponack, L.L.P.

(57) ABSTRACT

Three-dimensional point group data indicating three-dimensional coordinate sets of three-dimensional points included in a common imaging space of one or more cameras is received, one or more images captured by the one or more cameras are transmitted, the one or more transmitted images are received, initial camera parameters of each cameras are decided based on one or more mounting locations and one or more directions of the cameras, corresponding points in the one or more images are calculated for each of the three-dimensional points, based on the three-dimensional point group data and the initial camera parameters, and one
(Continued)

or more camera parameters of the one or more cameras are calculated based on pixel values at the corresponding points in the one or more images.

17 Claims, 28 Drawing Sheets

(51) Int. Cl.
*G06T 7/80* (2017.01)
*H04N 13/246* (2018.01)
*H04N 13/239* (2018.01)

(52) U.S. Cl.
CPC ....... *H04N 13/246* (2018.05); *G06T 2200/04* (2013.01); *G06T 2207/10012* (2013.01); *G06T 2207/10024* (2013.01); *G06T 2207/30208* (2013.01); *G06T 2207/30264* (2013.01)

(58) Field of Classification Search
CPC ........... H04N 13/239; G06T 7/80; G06T 7/85; G06T 2200/04; G06T 2207/10012; G06T 2207/10024; G06T 2207/30208
USPC .................................................. 348/135, 169
See application file for complete search history.

(56) References Cited

U.S. PATENT DOCUMENTS

2008/0031514 A1  2/2008  Kakinami
2013/0147948 A1  6/2013  Higuchi et al.

FOREIGN PATENT DOCUMENTS

| JP | 2011-215082 | 10/2011 |
| JP | 2012-075060 | 4/2012 |
| JP | 2012-088114 | 5/2012 |
| JP | 2012-242317 | 12/2012 |

OTHER PUBLICATIONS

Zhengyou Zhang, "A Flexible New Technique for Camera Calibration", IEEE Transactions on Pattern Analysis and Machine Intelligence, vol. 22, No. 11, Nov. 11, 2000, pp. 1330-1334.

* cited by examiner

# CAMERA PARAMETER CALCULATION METHOD, RECORDING MEDIUM, CAMERA PARAMETER CALCULATION APPARATUS, AND CAMERA PARAMETER CALCULATION SYSTEM

BACKGROUND

1. Technical Field

The present disclosure relates to a technique for calculating camera parameters.

2. Description of the Related Art

To calculate camera parameters, namely to calibrate a camera, it is necessary to associate a three-dimensional coordinate set in a three-dimensional space and an image coordinate pair in a two-dimensional image. For this purpose, conventionally, a three-dimensional coordinate set and an image coordinate pair in a two-dimensional image are associated by imaging a calibration index such as a checked pattern having a known shape, and detecting intersecting points of the checked pattern that is the calibration index and points that correspond to the intersecting points in the imaged checked pattern (for example, see Japanese Patent No. 4681856, Japanese Patent No. 5580164, Roger Y. Tsai, "A Versatile Camera Calibration Technique for High-Accuracy 3D Machine Vision Metrology Using Off-The-Shelf TV Cameras and Lenses", IEEE Journal of Robotics and Automation, Vol. 3, pp. 323-344, 1987, and Zhengyou Zhang, "A Flexible New Technique for Camera Calibration", IEEE Transactions on Pattern Analysis and Machine Intelligence, Vol. 22, pp. 1330-1334, 2000).

SUMMARY

In conventional camera calibration, a calibration index having a known three-dimensional structure is used. A calibration index having high processing precision and a wide imaging space are therefore necessary. Furthermore, in this kind of calibration of a wide-angle camera, large-scale calibration equipment is necessary to arrange a calibration index across the entire field of view of the camera.

One non-limiting and exemplary embodiment provides the calibration of a single-lens camera and a stereo camera or multi-lens camera without using a calibration index having a known three-dimensional structure.

In one general aspect, the techniques disclosed here feature a camera parameter calculation method that includes: (a1) receiving three-dimensional point group data indicating three-dimensional coordinate sets of three-dimensional points included in a common imaging space of one or more cameras installed on a mobile body; (a2) transmitting one or more images captured by the one or more cameras; (a3) receiving the one or more images transmitted in process (a2); (a4) deciding one or more initial camera parameters of the one or more cameras, based on one or more mounting locations and one or more directions of the one or more cameras; (a5) calculating corresponding points in the one or more images received in process (a3), for each of the three-dimensional points, based on the three-dimensional point group data received in process (a1) and the one or more initial camera parameters decided in process (a4); (a6) calculating one or more camera parameters of the one or more cameras, based on pixel values at the corresponding points calculated in process (a5), in the one or more images; and (a7) outputting the one or more camera parameters calculated in process (a6), the one or more cameras having a one-to-one relationship with the one or more initial camera parameters, the one or more cameras having a one-to-one relationship with the one or more images, and the one or more cameras having a one-to-one relationship with the one or more camera parameters, and a processor executing at least one of processes (a1) to (a7).

According to the camera calibration technique of the present disclosure, a camera parameter is evaluated based on pixel values at image coordinate pairs obtained by projecting three-dimensional coordinate sets onto an image using the camera parameter, and the camera parameter can thereby be calculated, namely the camera can be calibrated, without using a calibration index having a known three-dimensional structure. A camera can therefore be calibrated without associating a three-dimensional coordinate set in a three-dimensional space and an image coordinate pair in a two-dimensional image.

It should be noted that general or specific aspects hereof may be realized by an apparatus, a system, an integrated circuit, a computer program, or a computer-readable recording medium, and may be realized by an arbitrary combination of an apparatus, a system, a method, an integrated circuit, a computer program, and a computer-readable recording medium. A computer-readable recording medium includes a nonvolatile recording medium such as a compact disc read-only memory (CD-ROM), for example.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION (Underlying Knowledge Forming Basis of the Present Disclosure)

The present inventor discovered that the following problems occur in relation to the camera calibration described in the Description of the Related Art section. In the specification, the term "coordinate pair" refers to a single combination of a coordinate for one axis and a coordinate for another axis in a two-dimensional Cartesian coordinate system, and the term "coordinate set" refers to a single combination of a coordinate for one axis, a coordinate for another axis, and a coordinate for further another axis in a three-dimensional Cartesian coordinate system.

In order to calibrate a camera, it is necessary to associate three-dimensional coordinate sets of points of interest, for example, points on a subject, in a three-dimensional space in which the camera is present, and two-dimensional coordinate pairs of points (hereinafter, referred to as corresponding points) at which the points of interest have been captured in a two-dimensional image, the two-dimensional image having been obtained by capturing the points of interest using the camera. For this purpose, conventionally, a calibration index such as a checked pattern having a known shape is captured. Three-dimensional coordinate sets and image coordinate pairs in a two-dimensional image are then associated by detecting intersecting points of the checked pattern that is the calibration index and points that correspond to the intersecting points in the captured checked pattern. Here, a three-dimensional coordinate set in the three-dimensional space is referred to as a world coordinate set, and a two-dimensional coordinate pair in the two-dimensional image is referred to as an image coordinate pair. The world coordinate set is defined by a world coordinate space.

Figure 33:
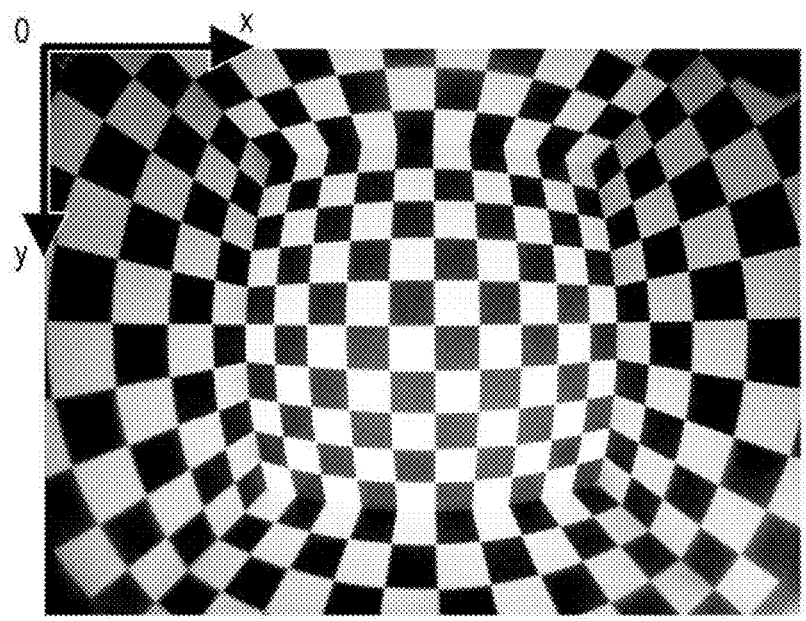
FIG. 33 is an image of a checked pattern captured by a fish-eye camera.

For example, FIG. 33 is a calibration index in which a checked pattern has been drawn at fixed intervals inside a box-shaped subject. For pixel locations within a two-dimensional image, an operator reads in locations that correspond to the intersecting points of the checked pattern in an image coordinate system in which the point of origin is taken as the top left of the image in which the checked pattern has been captured, as depicted in FIG. 33. Three-dimensional coordinate sets of the intersecting points of the checked pattern are obtained from the checked pattern used for imaging. Specifically, a three-dimensional coordinate set can be identified by setting the point of origin and the three axes of X, Y, and Z of the world coordinate space at a specific location, and determining which intersecting point of the checked pattern from the point of origin corresponds to an intersecting point of interest.

Points in the world coordinate space can be projected onto an image coordinate plane by means of a coordinate conversion that is based on camera parameters. In other words, coordinate pairs of corresponding points on a camera image that correspond to coordinate sets of points in the world coordinate space can be calculated and obtained using camera parameters. Conversely, camera parameters can be calculated by pairing a world coordinate set and an image coordinate pair that actually correspond. Using a pinhole camera as an example, the relationship between a world coordinate set $(X, Y, Z)$ and an image coordinate pair $(x_u, y_u)$ using camera parameters is indicated in expression 1.

$$h\begin{bmatrix} x_u \\ y_u \\ 1 \end{bmatrix} = \begin{bmatrix} 1/d'x & 0 & C_x \\ 0 & 1/d'y & C_y \\ 0 & 0 & 1 \end{bmatrix} \begin{bmatrix} f & 0 & 0 & 0 \\ 0 & f & 0 & 0 \\ 0 & 0 & 1 & 0 \end{bmatrix}$$ (Expression 1)

$$\begin{bmatrix} R_{11} & R_{12} & R_{13} & T_x \\ R_{21} & R_{22} & R_{23} & T_y \\ R_{31} & R_{32} & R_{33} & T_z \\ 0 & 0 & 0 & 1 \end{bmatrix} \begin{bmatrix} X \\ Y \\ Z \\ 1 \end{bmatrix}$$

For the camera parameters of this pinhole camera model, an x component and y component in the center of an image are taken as $C_x$ and $C_y$ respectively, the focal length is taken as f, and the lengths in the x direction and y direction of one pixel of an imaging element are taken as $d'_x$ and $d'_y$, respectively. Furthermore, a three-row three-column matrix representing the direction of the camera (an amount of rotation from a reference direction in the world coordinate space) is taken as a rotation R (the tens place of the subscript of the array elements represents the row and the ones place represents the column), a three-row one-column matrix representing the mounting location of the camera (an amount of displacement from a reference point in the world coordinate space) is taken as a translation T (x, y, and z of the subscript of the array elements represent the coordinate axis), and a parameter having no degree of freedom is taken as h. Furthermore, distortion such as distortion aberration can be expressed by using $\Phi([x_u\ y_u]T)$, which represents a conversion from an image coordinate pair $(x_u, y_u)$ having no distortion to an image coordinate pair (x, y) having distortion (expression 2).

$$\begin{bmatrix} x \\ y \end{bmatrix} = \Phi\left(\begin{bmatrix} x_u \\ y_u \end{bmatrix}\right) \quad \text{(Expression 2)}$$

Conventional camera calibration techniques and problems therewith will be described in turn.

In Roger Y. Tsai, "A Versatile Camera Calibration Technique for High-Accuracy 3D Machine Vision Metrology Using Off-The-Shelf TV Cameras and Lenses", IEEE Journal of Robotics and Automation, Vol. 3, pp. 323-344, 1987, with respect to world coordinate sets of points of interest and image coordinate pairs of points at which the points of interest have been captured in a two-dimensional image obtained by capturing the points of interest, image coordinate pairs at which the world coordinate sets are projected onto the image are obtained using camera parameters. A camera is calibrated by minimizing the sum total of the distances (reprojection errors) between the image coordinate pairs of the points at which the points of interest have been captured and the image coordinate pairs at which the world coordinate sets have been projected. It is therefore necessary to associate the world coordinate sets of the points of interest and the pixel locations of the points at which the points of interest have been captured in the two-dimensional image.

In Zhengyou Zhang, "A Flexible New Technique for Camera Calibration", IEEE Transactions on Pattern Analysis and Machine Intelligence, Vol. 22, pp. 1330-1334, 2000, calibration indexes are set up at different depths, and the calibration indexes arranged on multiple planes are respectively captured by one camera. With respect to pairs each including a world coordinate set of a point of interest included in a corresponding calibration index and an image coordinate pair of a point at which the point of interest has been captured in a captured image, coordinate pairs of points at which world coordinate sets are projected onto captured images are obtained using camera parameters. The squares of the distances between the coordinate pairs of the points at which the world coordinate sets are projected onto the image and the image coordinate pairs of the points at which the points of interest have been captured in the captured image are obtained. The camera is calibrated by minimizing the sum total of the squares of the distances corresponding to each pair. It is therefore necessary to associate the world coordinate sets of the points of interest and the pixel locations of the points at which the points of interest have been captured in the two-dimensional image.

In Japanese Patent No. 4681856, information is input regarding calibration points on planes on which three-dimensional coordinate sets, which are world coordinate sets, and pixel values within a two-dimensional image are associated over multiple frames. Camera parameters are decided in such a way that calibration points that are present on planes defined in the world coordinate space and calibration points at image coordinate pairs are subjected to a planar projective transformation. It is therefore necessary to associate three-dimensional coordinate sets in a three-dimensional space and pixel locations within a two-dimensional image.

In Japanese Patent No. 5580164, a three-dimensional laser scanner and a stereo camera acquire respective three-dimensional locations. The three-dimensional locations acquired by the three-dimensional laser scanner and the stereo camera are associated, and the stereo camera is calibrated based on the three-dimensional locations acquired by the three-dimensional laser scanner, which has greater distance measurement precision than the stereo camera. The calibration method will be described below. The camera parameters of the stereo camera are calibrated in such a way that the three-dimensional coordinate set acquired by the stereo camera matches the three-dimensional coordinate set acquired by the three-dimensional laser scanner that corresponds to the three-dimensional coordinate set acquired by the stereo camera. Manually associating the three-dimensional points is complex, and a dedicated calibration index is necessary in the case where this process is to be carried out automatically. Furthermore, in the case where an error is included in camera parameters in a small stereo camera having a short baseline length, the decline in distance measurement precision is large compared to a stereo camera having a long baseline length. Therefore, in the case where the baseline length is short compared to the subject distance, there is a possibility of there being erroneous correspondence with the three-dimensional locations of the three-dimensional laser scanner.

Stereo cameras are used for peripheral monitoring, driving support, and the like in mobile bodies such as cars and drones. A wide-angle camera is preferred for such purposes. A general stereo camera intended for such distance measurement requires calibration at the time of manufacturing. Furthermore, recalibration of the camera is necessary for distortion caused by changes due to aging and impacts.

Ordinarily, the calibration performed at the time of manufacturing and the recalibration are carried out using dedicated calibration equipment. A calibration index having a known three-dimensional structure is used in these calibrations. A calibration index having high processing precision and a wide imaging space are therefore necessary. Furthermore, in this kind of calibration of a wide-angle camera, large-scale calibration equipment is necessary to arrange a calibration index across the entire field of view of the wide-angle camera. Furthermore, it is difficult to move large-scale calibration equipment. Thus, in a case where a camera mounted on a mobile body is to be calibrated using large-scale calibration equipment, calibration has to be carried out at the installation site of the large-scale calibration equipment. That is, it is necessary for the mobile body to be transported to the installation site of the calibration equipment for the camera to be calibrated. In addition, the user is not able to use the mobile body during transportation of the mobile body to the calibration equipment or during the camera calibration.

The present disclosure has been invented in light of the aforementioned problems, and the purpose thereof is to calibrate a camera mounted on a mobile body, without using a calibration index having a known three-dimensional structure.

A camera parameter calculation method according to one aspect of the present disclosure includes: (a1) receiving three-dimensional point group data indicating three-dimensional coordinate sets of three-dimensional points included in a common imaging space of one or more cameras installed on a mobile body; (a2) transmitting one or more images captured by the one or more cameras; (a3) receiving the one or more images transmitted in process (a2); (a4) deciding one or more initial camera parameters of the one or more cameras, based on one or more mounting locations and one or more directions of the one or more cameras; (a5) calculating corresponding points in the one or more images received in process (a3), for each of the three-dimensional points, based on the three-dimensional point group data received in process (a1) and the one or more initial camera parameters decided in process (a4); (a6) calculating one or more camera parameters of the one or more cameras, based on pixel values at the corresponding points calculated in process (a5), in the one or more images; and (a7) outputting the one or more camera parameters calculated in process (a6), the one or more cameras having a one-to-one relationship with the one or more initial camera parameters, the one or more cameras having a one-to-one relationship with the one or more images, and the one or more cameras having a one-to-one relationship with the one or more camera parameters, and a processor executing at least one of processes (a1) to (a7).

According to this configuration, a camera parameter are evaluated based on pixel values at image coordinate pairs obtained by projecting three-dimensional coordinate sets onto an image using the camera parameter, and therefore the camera parameter can be calculated, namely a camera can be calibrated, without using a calibration index having a known three-dimensional structure. A camera installed on a mobile body can therefore be calibrated without associating three-dimensional coordinate sets in a three-dimensional space and pixel locations in a two-dimensional image.

Furthermore, since the processor can decide the one or more initial camera parameters of the one or more cameras on the basis of the one or more mounting locations and the one or more directions of the one or more cameras, the one or more initial camera parameters can be decided without requiring a manual operation.

Furthermore, in process (a5), the three-dimensional coordinate sets may be converted into image coordinate pairs of the corresponding points in the one or more images corresponding to the one or more cameras, based on the one or more initial camera parameters corresponding to the one or more cameras.

According to this configuration, the image coordinate pairs can be calculated from the three-dimensional coordinate sets using a typical coordinate conversion procedure in which camera parameters corresponding to a camera model such as a pinhole camera model serve as a medium, for example.

Furthermore, the one or more cameras may include two cameras, in process (a6), the one or more camera parameters may be calculated based on differences, and each of the differences may be a difference between: a pixel value at a corresponding point in a first image captured by a first camera included in the two cameras, for one three-dimensional point from among the three-dimensional points; and a pixel value at a corresponding point in a second image captured by a second camera included in the two cameras, for the one three-dimensional point.

According to this configuration, if the camera parameters are correct, one three-dimensional point is correctly projected onto the corresponding points in the individual images, and therefore the differences all approach 0. That is, the total of the differences being large means that errors in the corresponding points in the individual images are large, namely that errors in the camera parameters are large. Therefore, for example, an evaluation function defined by the total of the differences is introduced, and the camera parameters are updated in such a way that the evaluation function becomes smaller, by means of a well-known procedure such as the gradient descent method. Thus, camera calibration can be carried out with reduced errors in the camera parameters.

Furthermore, the one or more cameras may be two or more cameras, in process (a6), the one or more camera parameters may be calculated based on differences, and each of the differences may be a difference between: one pixel value from among pixel values at corresponding points in individual images captured by the two or more cameras, for one three-dimensional point from among the three-dimensional points; and an average value for the pixel values. The difference may be an absolute value of the difference between the pixel values, or may be a square value of the difference between the pixel values.

According to this configuration, if the camera parameters are correct, one three-dimensional point is correctly projected onto the corresponding points in the individual images, and therefore the differences all approach 0. That is, the total of the differences being large means that errors in the corresponding points in the individual images are large, namely that errors in the camera parameters are large. Therefore, for example, an evaluation function defined by the total of the differences is introduced, and the camera parameters are updated in such a way that the evaluation function becomes smaller, by means of a well-known procedure such as the gradient descent method. Thus, camera calibration can be carried out with reduced errors in the camera parameters.

Furthermore, the one or more cameras may be two or more cameras, and, in process (a6), the one or more camera parameters may be calculated based on a degree of similarity between pixel value patterns in neighboring pixels of corresponding points in the individual images, corresponding to the same three-dimensional point. Specifically, in process (a6), the one or more camera parameters may be calculated based on normalized cross-correlations, and each of the normalized cross-correlations may be a correlation of pixel values included in a vicinity of the corresponding points in the individual images captured by the two or more cameras, for one three-dimensional point from among the three-dimensional points.

According to this configuration, even in the case where there is a gain difference in the individual images (for example, an overall luminance difference caused by an inconsistency in exposure), it is possible to eliminate the gain difference and know the magnitude of the errors in the corresponding points on the basis of the similarity between the pixel value patterns.

Furthermore, in process (a6), three-dimensional points at which corresponding points having a distance of separation that is equal to or less than a threshold value are obtained in at least any one image, from among the three-dimensional points, may be excluded from calculation of the one or more camera parameters.

In this configuration, the corresponding points having a distance of separation that is equal to or less than a threshold value are corresponding points for three-dimensional points that are present in a region extending in substantially one direction from a camera. Therefore, there is a possibility of a rear three-dimensional object being covered by a front three-dimensional object. Thus, when the camera parameters are calculated, three-dimensional points at which corresponding points having a distance of separation that is equal to or less than a threshold value are obtained are excluded from the calculation of the camera parameters. Thus, pixel values of corresponding points that may indicate pixel values that are different from the original values can be excluded from the calculation of evaluation values, and evaluation values can be calculated with the effect of covering being eliminated.

Furthermore, in process (a6), the one or more camera parameters may be calculated from three-dimensional points having excluded therefrom one or more three-dimensional points at which a luminance gradient at a corresponding point in at least one image from among the one or more images is less than a threshold value, from among the three-dimensional points.

According to this configuration, camera parameters are calculated excluding three-dimensional points located in regions having a small luminance gradient in the camera images, and the calculation amount can thereby be reduced with calculations using three-dimensional points having little contribution to the evaluation values being omitted.

The three-dimensional point group data may indicate three-dimensional locations of the three-dimensional points, based on reflection of measurement light emitted from a predetermined distance measurement viewpoint, and, in process (a6), two three-dimensional points, included in the three-dimensional points, with which a distance between the two three-dimensional points is greater than a threshold value and an angle formed by a direction vector of the measurement light toward the two three-dimensional points is less than a threshold value, may be excluded from calculation of the one or more camera parameters.

In this configuration, the two three-dimensional points are a gap region located at a boundary between objects or a in region having considerable surface unevenness in the three-dimensional point group data, and gaps are liable to also occur in the pixel values of corresponding points in images. When the pixel values of corresponding points such as these are used in the calculation of evaluation values, there is concern that the convergence of the camera parameters will be caused to deteriorate due to the evaluation values changing too sharply for errors in the corresponding points. For this kind of problem, in the aforementioned configuration, boundaries between objects and regions having considerable surface unevenness can be avoided, and evaluation values can be calculated using pixel values of appropriate regions.

Furthermore, the three-dimensional point group data may indicate three-dimensional locations of the three-dimensional points and intensity values of return light of measurement light from each three-dimensional point, based on reflection of the measurement light emitted from a predetermined distance measurement viewpoint, and, in process (a6), the one or more camera parameters may be calculated using three-dimensional points that are visible within a predetermined vicinity from the distance measurement viewpoint and have a difference between the intensity values that is within a range decided using a first threshold value and a second threshold value, from among the three-dimensional points.

According to this configuration, the camera parameters can be calculated using three-dimensional points that are within a range in which the intensity of measurement light, namely the reflectance of an object, changes in a smooth manner. For example, in regions in which there is a gap in the reflectance of objects due to a boundary between objects or the like, gaps are liable to also occur in the pixel values of the corresponding points in images. When the pixel values of corresponding points such as these are used in the calculation of evaluation values, there is concern that the convergence of the camera parameters will be caused to deteriorate due to the evaluation values changing too sharply for errors in the corresponding points. For this kind of problem, in the aforementioned configuration, regions in which there is an excessive difference in the reflectance of an object can be avoided, and evaluation values can be calculated using pixel values of appropriate regions. Furthermore, regions in which changes in reflectance occur excessively, such as uniform continuous surfaces, for example, are also excluded from the calculation of evaluation values as such regions hinder convergence of the camera parameters.

Furthermore, the three-dimensional point group data may be data obtained by measuring distances of the three-dimensional points using a three-dimensional laser scanner.

According to this configuration, the three-dimensional point group data can be obtained from a three-dimensional laser scanner that is generally easy to use.

Furthermore, the three-dimensional point group data may indicate three-dimensional locations of the three-dimensional points and a color of an object at each three-dimensional point, based on reflection of measurement light emitted from a predetermined distance measurement viewpoint and color imaging from the distance measurement viewpoint, and, in process (a6), the one or more camera parameters may be calculated using three-dimensional points that are visible within a predetermined vicinity from the distance measurement viewpoint and have a difference between the colors of the objects that is within a range decided using a first threshold value and a second threshold value, from among the three-dimensional points.

According to this configuration, the camera parameters can be calculated using three-dimensional points within a range in which the color of an object changes in a smooth manner. For example, in regions in which there is a gap in the colors of objects due to a boundary between objects or the like, gaps also occur in the colors of the corresponding points in the images. When the pixel values of corresponding points such as these are used in the calculation of evaluation values, there is concern that the convergence of the camera parameters will be caused to deteriorate due to the evaluation values changing too sharply for errors in the corresponding points. For this kind of problem, in the aforementioned configuration, regions in which there is an excessive difference in the colors of objects can be avoided, and evaluation values can be calculated using pixel values of appropriate regions. Furthermore, for example, regions in which changes in color occur excessively, such as uniform continuous surfaces, are also excluded from the calculation of evaluation values as such regions hinder convergence of the camera parameters.

Furthermore, the three-dimensional point group data may indicate three-dimensional locations of the three-dimensional points and a color of an object at each three-dimensional point, based on reflection of measurement light emitted from a predetermined distance measurement viewpoint and color imaging from the distance measurement viewpoint, each of the one or more cameras may be a color camera, and, in process (a6), a camera parameter of one camera from among the one or more cameras may be calculated based on differences, and each of the differences may be a difference between: a color indicated by a pixel value at a corresponding point in an image captured by the one camera, for one three-dimensional point from among the three-dimensional points, and the color of the object at the one three-dimensional point indicated by the three-dimensional point group data.

According to this configuration, by using information regarding the color of an object indicated by the three-dimensional point group data, a single camera can be calibrated and multiple cameras can be calibrated one at a time.

Furthermore, in process (a1), the three-dimensional point group data may be received from a three-dimensional laser scanner provided with a color camera that color-images a distance measurement space.

According to this configuration, the three-dimensional point group data can be received together with color information from a three-dimensional laser scanner.

Furthermore, a recording medium according to one aspect of the present disclosure is provided with a control program for causing a device provided with a processor to execute processes, the recording medium being nonvolatile and computer-readable, the processes including: (a1) a process of receiving point group data that acquires three-dimensional point group data indicating three-dimensional locations of three-dimensional points included in an imaging space of one or more cameras installed on a mobile body; (a2) a process of transmitting one or more images captured by the one or more cameras; (a3) a process of receiving the one or more images transmitted in process (a2); (a4) a process of deciding one or more initial camera parameters of the one or more cameras, based on one or more mounting locations and one or more directions of the one or more cameras; (a5) a process of calculating corresponding points in the one or more images received in process (a3), for each of the three-dimensional points, based on the three-dimensional point group data and the one or more initial camera parameters; (a6) a process of calculating one or more camera parameters of the one or more cameras, based on pixel values at the corresponding points in the one or more images; and (a7) a process of outputting the one or more camera parameters calculated in process (a6), and the one or more cameras having a one-to-one relationship with the one or more initial camera parameters, the one or more cameras having a one-to-one relationship with the one or more images, and the one or more cameras having a one-to-one relationship with the one or more camera parameters.

According to this configuration, an effect that is equivalent to the effect described with regard to the camera parameter calculation method can be obtained in a camera parameter calculation program.

Furthermore, a camera parameter calculation apparatus according to one aspect of the present disclosure is provided with: a processing circuit that calculates a camera parameter of a camera installed on a mobile body, the processing circuit: (a1) receiving three-dimensional point group data indicating three-dimensional coordinate sets of three-dimensional points included in a common imaging space of one or more cameras; (a2) transmitting one or more images captured by the one or more cameras; (a3) receiving the one or more images transmitted in process (a2); (a4) deciding one or more initial camera parameters of the one or more cameras, based on one or more mounting locations and one or more directions of the one or more cameras; (a5) calculating corresponding points in the one or more images received in process (a3), for each of the three-dimensional points, based on the three-dimensional point group data received in process (a1) and the one or more initial camera parameters decided in process (a4); (a6) calculating one or more camera parameters of the one or more cameras, based on pixel values at the corresponding points calculated in process (a5), in the one or more images; and (a7) outputting the one or more camera parameters calculated in process (a6), and the one or more cameras having a one-to-one relationship with the one or more initial camera parameters, the one or more cameras having a one-to-one relationship with the one or more images, and the one or more cameras having a one-to-one relationship with the one or more camera parameters.

According to this configuration, an effect that is equivalent to the effect described with regard to the camera parameter calculation method can be obtained in a camera parameter calculation apparatus.

Furthermore, a camera parameter calculation system according to one aspect of the present disclosure is provided with: a three-dimensional laser scanner that is installed in a fixed manner in a common imaging space of one or more cameras; and a processing circuit that calculates a camera parameter of a camera installed on a mobile body, the three-dimensional laser scanner measuring a location and a direction of the mobile body in a three-dimensional coordinate system of three-dimensional points included in the imaging space, and the processing circuit: (a1) receiving three-dimensional point group data indicating the three-dimensional coordinate sets of the three-dimensional points included in the imaging space; (a2) transmitting one or more images captured by the one or more cameras; (a3) receiving the one or more images transmitted in process (a2); (a4) calculating one or more mounting locations and one or more directions of the one or more cameras in the three-dimensional coordinate system, based on the location and the direction of the mobile body measured by the three-dimensional laser scanner, and deciding one or more initial camera parameters of the one or more cameras, based on the one or more mounting locations and the one or more directions of the one or more cameras; (a5) calculating corresponding points in the one or more images received in process (a3), for each of the three-dimensional points, based on the three-dimensional point group data received in process (a1) and the one or more initial camera parameters decided in process (a4); (a6) calculating one or more camera parameters of the one or more cameras, based on pixel values at the corresponding points calculated in process (a5), in the one or more images; and (a7) outputting the one or more camera parameters calculated in process (a6), the one or more cameras having a one-to-one relationship with the one or more initial camera parameters, the one or more cameras having a one-to-one relationship with the one or more images, and the one or more cameras having a one-to-one relationship with the one or more camera parameters.

Furthermore, a camera parameter calculation system according to one aspect of the present disclosure is provided with: a three-dimensional laser scanner that is installed in a fixed manner in a common imaging space of one or more cameras; and a processing circuit that calculates a camera parameter of a camera installed on a mobile body, the three-dimensional laser scanner detecting the mobile body stopping at a calibration start location that is a predetermined stopping location for the mobile body for calibration of a camera parameter calculation apparatus, and the processing circuit: (a1) receiving three-dimensional point group data indicating three-dimensional coordinate sets of three-dimensional points included in the imaging space; (a2) transmitting one or more images captured by the one or more cameras; (a3) receiving the one or more images transmitted in process (a2); (a4) calculating one or more mounting locations and one or more directions of the one or more cameras in a three-dimensional coordinate system of the three-dimensional points using the calibration start location, and deciding one or more initial camera parameters of the one or more cameras, based on the one or more mounting locations and the one or more directions of the one or more cameras; (a5) calculating corresponding points in the one or more images received in process (a3), for each of the three-dimensional points, based on the three-dimensional point group data received in process (a1) and the one or more initial camera parameters decided in process (a4); (a6) calculating one or more camera parameters of the one or more cameras, based on pixel values at the corresponding points calculated in process (a5), in the one or more images; and (a7) outputting the one or more camera parameters calculated in process (a6), the one or more cameras having a one-to-one relationship with the one or more initial camera parameters, the one or more cameras having a one-to-one relationship with the one or more images, and the one or more cameras having a one-to-one relationship with the one or more camera parameters.

Furthermore, a camera parameter calculation system according to one aspect of the present disclosure is provided with: a three-dimensional laser scanner that is mounted on a mobile body; and a processing circuit that calculates a camera parameter of a camera installed on the mobile body, the processing circuit: (a1) receiving three-dimensional point group data indicating three-dimensional coordinate sets of three-dimensional points included in the imaging space; (a2) transmitting one or more images captured by the one or more cameras; (a3) receiving the one or more images transmitted in process (a2); (a4) calculating one or more mounting locations and one or more directions of the one or more cameras in a three-dimensional coordinate system of the three-dimensional points, based on one or more mounting locations and one or more directions of the three-dimensional laser scanner, and deciding one or more initial camera parameters of the one or more cameras, based on the one or more mounting locations and the one or more directions of the one or more cameras; (a5) calculating corresponding points in the one or more images received in process (a3), for each of the three-dimensional points, based on the three-dimensional point group data received in process (a1) and the one or more initial camera parameters decided in process (a4); (a6) calculating one or more camera parameters of the one or more cameras, based on pixel values at the corresponding points calculated in process (a5), in the one or more images; and (a7) outputting the one or more camera parameters calculated in process (a6), the one or more cameras having a one-to-one relationship with the one or more initial camera parameters, the one or more cameras having a one-to-one relationship with the one or more images, and the one or more cameras having a one-to-one relationship with the one or more camera parameters.

According to these camera parameter calculation systems, the one or more initial camera parameters can be decided without requiring a manual operation.

It should be noted that general or specific aspects hereof may be realized by a system, a method, an integrated circuit, a computer program, or a recording medium such as a computer-readable CD-ROM, and may be realized by an arbitrary combination of a system, a method, an integrated circuit, a computer program, and a recording medium.

Embodiment 1

Hereinafter, an embodiment of the present disclosure will be described with reference to the drawings. The present disclosure can be implemented in one or more cameras; however, to simplify the description, here, the present disclosure will be described using the example of a stereo camera including a left camera and a right camera.

Figure 1:
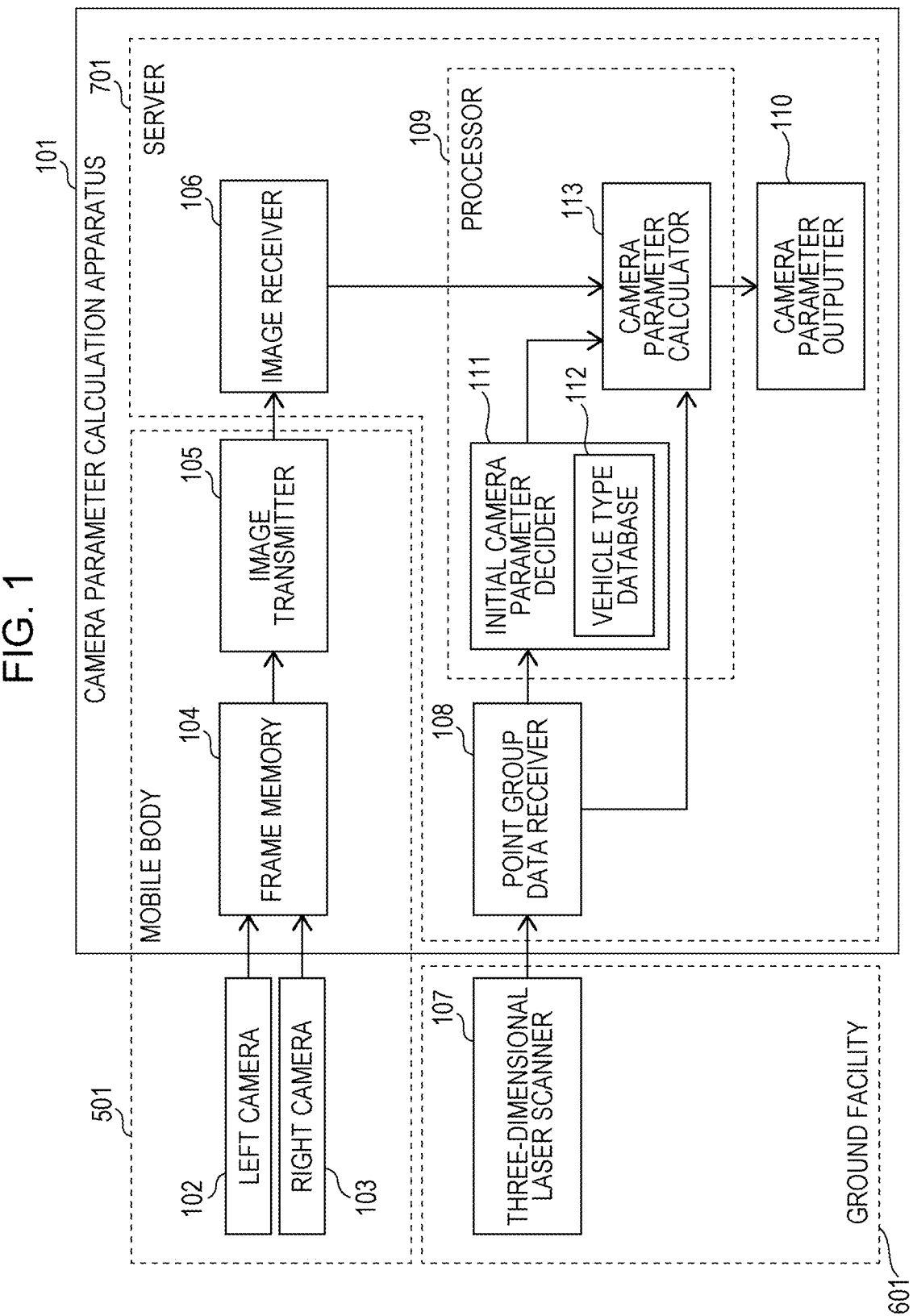
FIG. 1 is a block diagram depicting an example of the functional configuration of a camera parameter calculation apparatus according to embodiment 1.

FIG. 1 is a block diagram depicting an example of a functional configuration of a camera parameter calculation apparatus of embodiment 1. A camera parameter calculation apparatus 101 calibrates a left camera 102 and a right camera 103 mounted on a mobile body 501, using a three-dimensional laser scanner 107 included in a ground facility 601.

The three-dimensional laser scanner 107 may be installed in a fixed manner in a common imaging space of the left camera 102 and the right camera 103. As a non-limiting example, the three-dimensional laser scanner 107 may be installed in a parking lot of a facility, a gasoline stand, a hydrogen stand, a charging stand, an automobile dealer shop, or the like, as an example of an infrastructure facility for providing a camera calibration service.

A camera parameter calculation system is constituted by the camera parameter calculation apparatus 101 and the three-dimensional laser scanner 107.

It should be noted that calibrating a camera in the present specification means obtaining the camera parameters of an actual camera. Consequently, the camera parameter calculation apparatus and the camera parameter calculation system of the present specification are synonymous with a camera calibration apparatus and a camera calibration system.

The camera parameter calculation apparatus 101 includes a frame memory 104, an image transmitter 105, an image receiver 106, a point group data receiver 108, a processor 109, and a camera parameter outputter 110.

The camera parameter calculation apparatus 101 is realized as a distributed processing system provided distributed between the mobile body 501 and a server 701. Specifically, the frame memory 104 and the image transmitter 105 may be mounted in the mobile body 501, and the image receiver 106, the point group data receiver 108, the processor 109, and the camera parameter outputter 110 may be provided in the server 701. The image transmitter 105 and the image receiver 106 may be communicably connected to each other via a communication network (not depicted) such as a wireless LAN (local area network), for example.

Details of each constituent element depicted in FIG. 1 will be described hereinafter.

The left camera 102 captures a first space that is an imaging space, and sends a captured first image to the frame memory 104.

The right camera 103 captures a second space that is an imaging space, and sends a captured second image to the frame memory 104. The first space and the second space include a third space that is a common space. The third space may include one or more objects and/or one or more organisms. A subject that can be approximated by means of Lambertian reflectance is preferred from the point of view that the way in which the surface of the subject appears (the color at a certain point) according to the camera location does not change.

The frame memory 104 receives and stores the first image and the second image.

The image transmitter 105 transmits the first image and the second image stored in the frame memory 104 to the image receiver 106.

The image receiver 106 receives the images transmitted by the image transmitter 105. The image transmitter 105 and the image receiver 106 may be constituted by a hardware circuit that includes a wireless communication circuit.

The three-dimensional laser scanner 107 scans a space that includes the aforementioned third space with laser light, and measures the three-dimensional locations of points, in other words, three-dimensional points, included in the space that includes the third space. The three-dimensional laser scanner 107 measures the three-dimensional locations of the points on the external form of the mobile body 501, in addition to N number of calibration points within the third space. Data indicating the three-dimensional locations measured is called three-dimensional point group data. Each three-dimensional location is indicated by a coordinate set (X, Y, Z) in a world coordinate space that is based on the three-dimensional laser scanner 107. The three-dimensional laser scanner 107 sends the three-dimensional point group data to the point group data receiver 108 by means of wireless communication, for example. The three-dimensional point group data includes the three-dimensional locations of the N number of calibration points within the third space, and the three-dimensional locations of the points on the external form of the mobile body 501. Each of these three-dimensional locations may be expressed as a coordinate set in the world coordinate space.

The point group data receiver 108 receives the three-dimensional point group data from the three-dimensional laser scanner 107. The point group data receiver 108 may be constituted by a hardware circuit that includes a wireless communication circuit.

The processor 109 may be a general-purpose central processing unit (CPU) in the server 701. The processor 109 functions as an initial camera parameter decider 111 and a camera parameter calculator 113 by executing programs stored in advance in a memory.

The initial camera parameter decider 111 decides initial camera parameters of each of the left camera and the right camera on the basis of the three-dimensional locations of the points on the external form of the mobile body 501 included in the three-dimensional point group data received from the point group data receiver 108, and the mounting locations and directions of the left camera 102 and the right camera 103.

The camera parameter calculator 113 calculates image coordinate pairs of corresponding points in the first image and the second image received by the image receiver 106, for each of the three-dimensional points (particularly the calibration points within the third space) on the basis of the three-dimensional point group data and the initial camera parameters. Then, camera parameters of the left camera 102 are calculated based on the pixel values of the image coordinate pairs of the corresponding points in the first image, and camera parameters of the right camera 103 are calculated based on the pixel values of the image coordinate pairs of the corresponding points in the second image.

The camera parameter outputter 110 outputs the camera parameters calculated by the camera parameter calculator 113.

Next, a camera parameter calculation process carried out by the camera parameter calculation apparatus 101 will be described.

Figure 2:
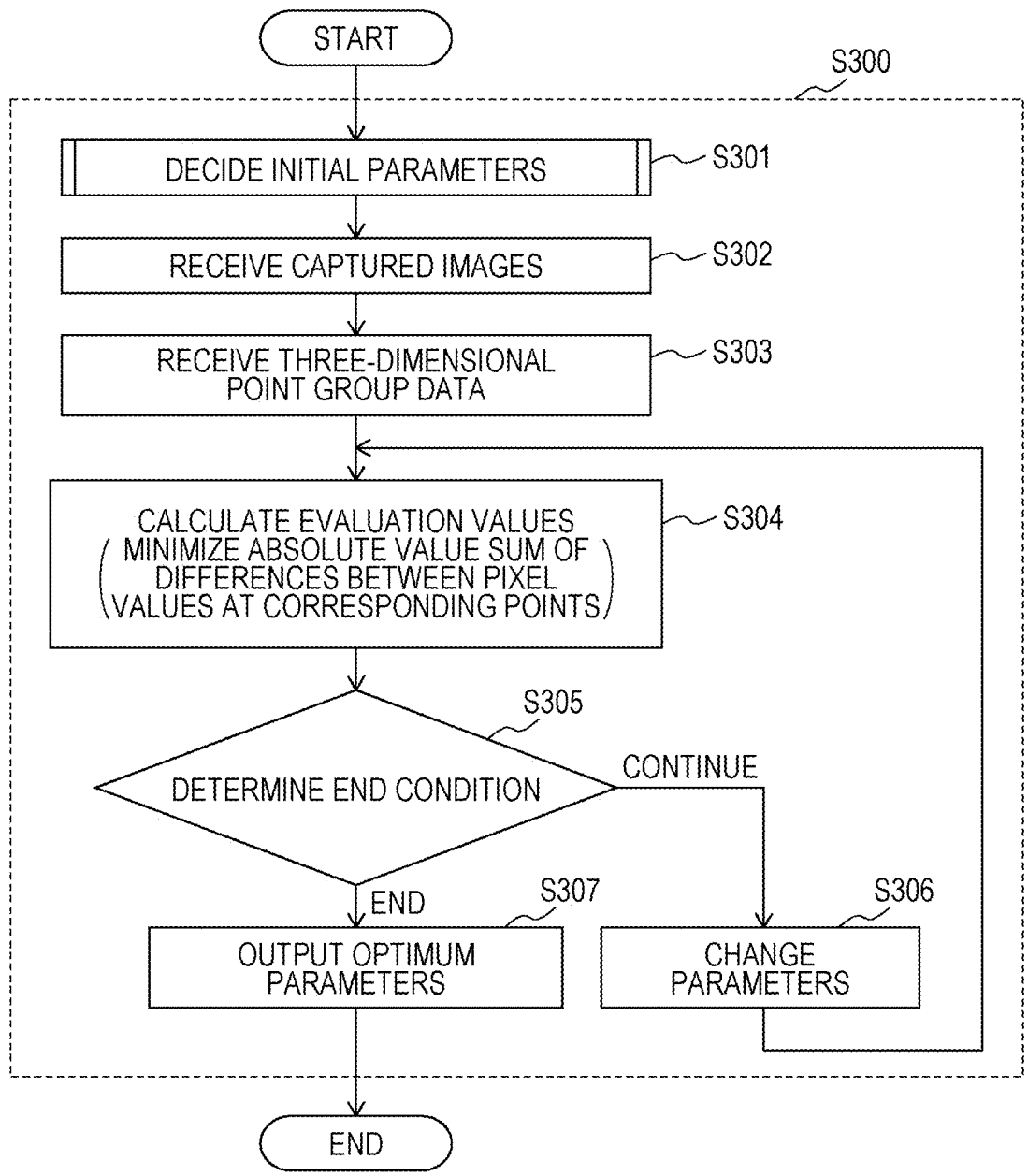
FIG. 2 is a flowchart depicting an example of an operation of the camera parameter calculation apparatus according to embodiment 1.

FIG. 2 is a flowchart depicting an example of a camera parameter calculation process S300. The camera parameter calculation process S300 includes an initial camera parameter decision process (S301) and a camera parameter calculation process (S302 to S307) that is based on decided initial camera parameters.

The initial camera parameter decision process (S301) will be described using a specific example in which initial values for camera parameters included in the aforementioned expression 1 are decided. From among the camera parameters included in expression 1, the rotation R and the translation T are parameters that are dependent on the mounting locations and directions of the cameras in the world coordinate space, and are called external parameters. Meanwhile, the x component $C_x$, the y component $C_y$, the focal length f, and the distances $d'_x$ and $d'_y$, are parameters that are not dependent on the mounting locations and directions of the cameras in the world coordinate space, and are called internal parameters.

Hereinafter, two detailed examples of the initial camera parameter decision process will be given.

Figure 3:
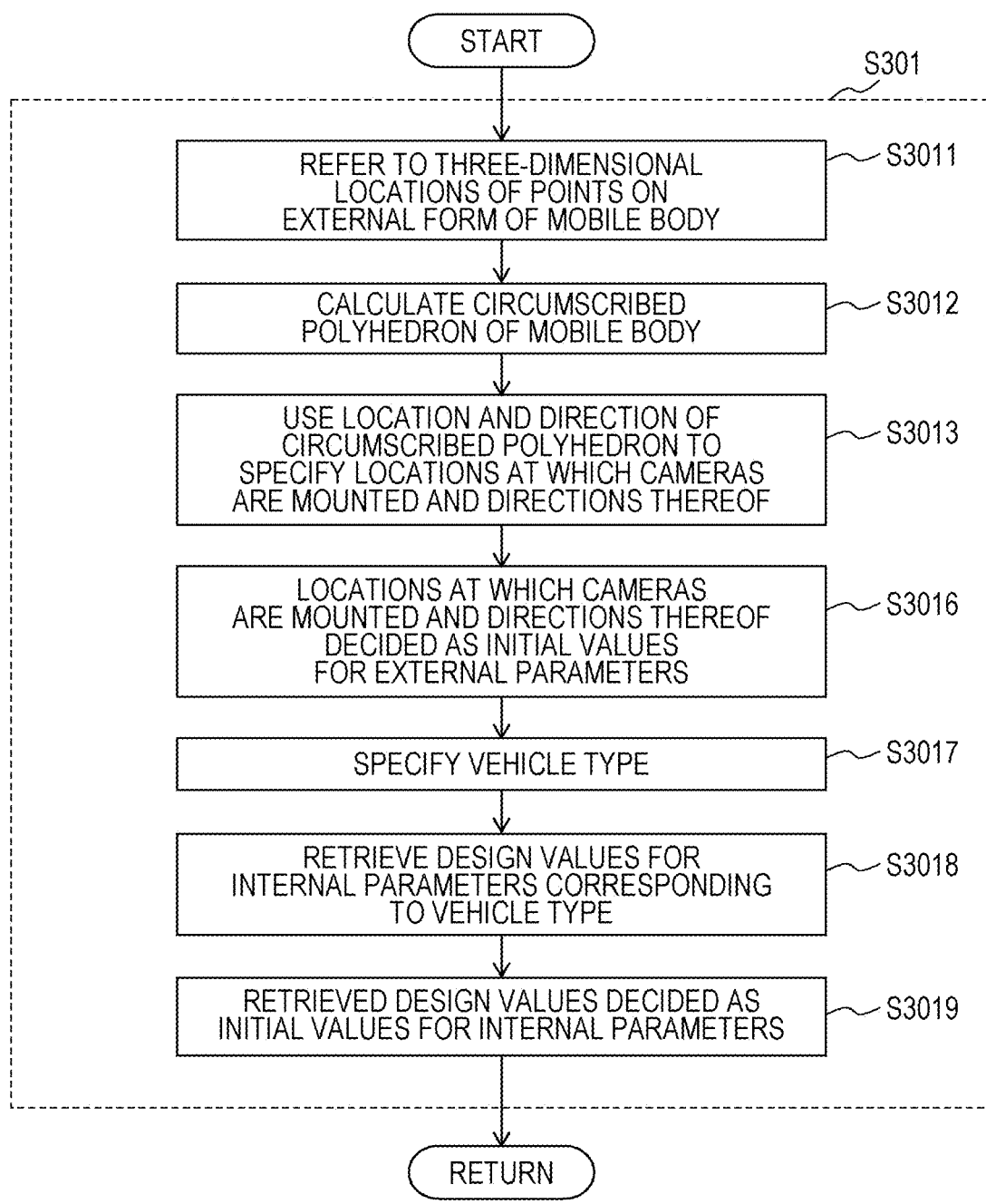
FIG. 3 is a flowchart depicting an example of an initial camera parameter decision process according to embodiment 1.

FIG. 3 is a flowchart depicting a first detailed example of the initial camera parameter decision process.

Figure 4:
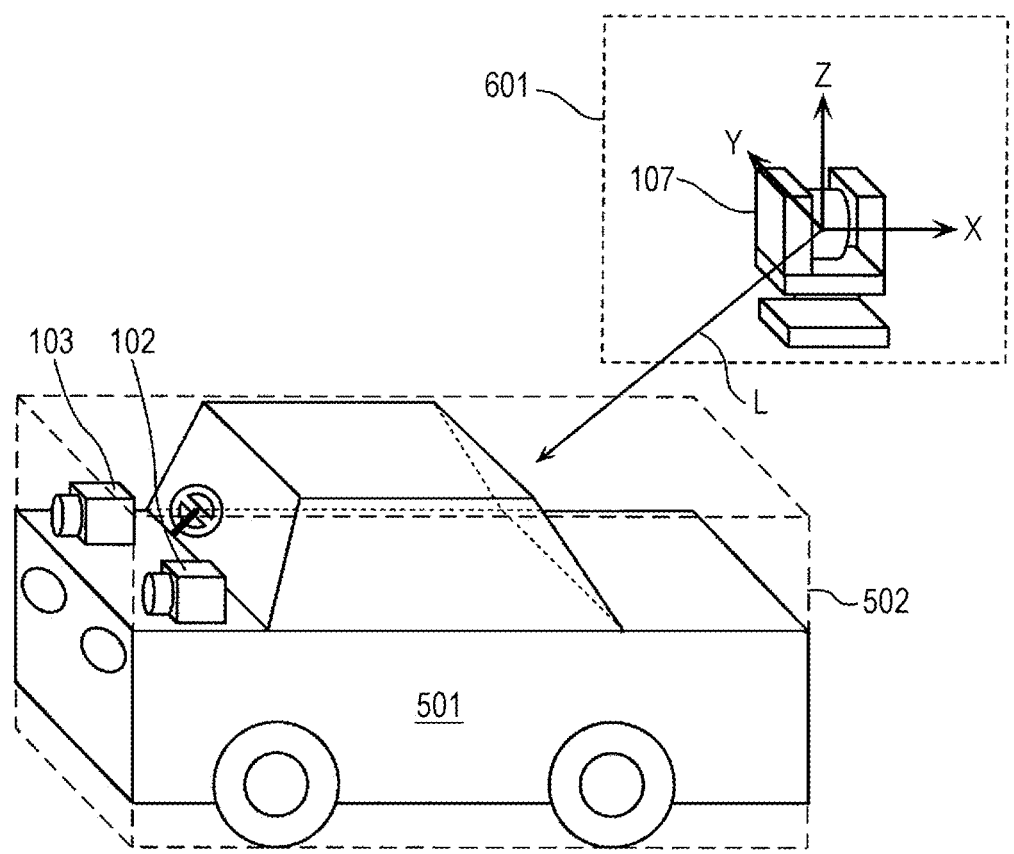
FIG. 4 is a schematic diagram depicting an application example of the initial camera parameter decision process according to embodiment 1.

FIG. 4 is a schematic diagram depicting an application example of the initial camera parameter decision process of FIG. 3.

The initial camera parameter decision process of FIG. 3 includes an external parameter initial value decision process (S3011 to S3015) and an internal parameter initial value decision process (S3016 to S3018).

The three-dimensional laser scanner 107 included in the ground facility 601 uses a laser light ray L to measure the locations of three-dimensional points including the points on the external form of the mobile body 501, and transmits three-dimensional point group data indicating the measurement results to the mobile body 501. The three-dimensional point group data includes three-dimensional coordinate sets respectively specifying the locations of the points on the external form of the mobile body 501.

The initial camera parameter decider 111 refers to the three-dimensional locations of the points on the external form of the mobile body 501, from the three-dimensional point group data received from the three-dimensional laser scanner 107 (S3011). The points on the external form of the mobile body 501 are a three-dimensional point group indicating the three-dimensional shape of the mobile body 501. The initial camera parameter decider 111 specifies the location and the direction of the mobile body 501 on the basis of the three-dimensional locations of the three-dimensional point group.

As a non-limiting example, the initial camera parameter decider 111 may calculate a circumscribed polyhedron 502 having the smallest polyhedron volume from among polyhedrons circumscribing the points on the external form of the mobile body 501 (S3012). The circumscribed polyhedron 502 is a rectangular cuboid or a three-dimensional shape in which a portion of a rectangular cuboid has been cut off, for example.

The initial camera parameter decider 111 uses the location and the direction of the circumscribed polyhedron 502 to specify the mounting locations and directions of the left camera 102 and the right camera 103 in the world coordinate space that is based on the three-dimensional laser scanner 107 (S3013). The mounting locations and directions of the left camera 102 and the right camera 103 that have been specified are then decided as the translation T and the rotation R of expression 1 (S3016).

Next, initial values for the internal parameters are decided. For the internal parameters, there are design values that are not dependent on the mounting locations and directions of the cameras, and these design values can be used as initial values for the internal parameters.

The design values for the internal parameters are generally specific to each vehicle type, and therefore design values for the internal parameters corresponding to each vehicle type are retained in a vehicle type database 112, and internal parameters are retrieved based on the vehicle type.

The initial camera parameter decider 111 specifies the vehicle type of the mobile body 501 (S3017). The method for specifying the vehicle type is not particularly restricted; however, for example, the shape of the mobile body 501 may be recognized based on the three-dimensional locations of the points on the external form of the mobile body 501 referred to in step S3011, and the vehicle type may be specified from the recognized shape. Furthermore, the mobile body 501 may be captured by a camera which is not depicted, and the vehicle type of the mobile body 501 may be specified based on image recognition.

The initial camera parameter decider 111 retrieves design values for internal parameters corresponding to the specified vehicle type from the vehicle type database 112 (S3018), and the retrieved design values are decided as initial values for the internal parameters (S3019).

In this way, by means of the initial camera parameter decision process S301, initial values for the camera parameters can be decided without including a manual operation.

It should be noted that using the circumscribed polyhedron 502 of the mobile body 501 is not essential for deciding initial values for the external parameters. For example, initial values for the external parameters can be decided by the mobile body stopping at a calibration start location, which is a stopping location that is decided in advance. A typical example of a calibration start location is a rectangular region demarcated by white lines indicating a stopping location for the mobile body at a gasoline stand, a parking lot, or the like. Hereinafter, an initial parameter decision process using a calibration start location will be described.

Figure 5:
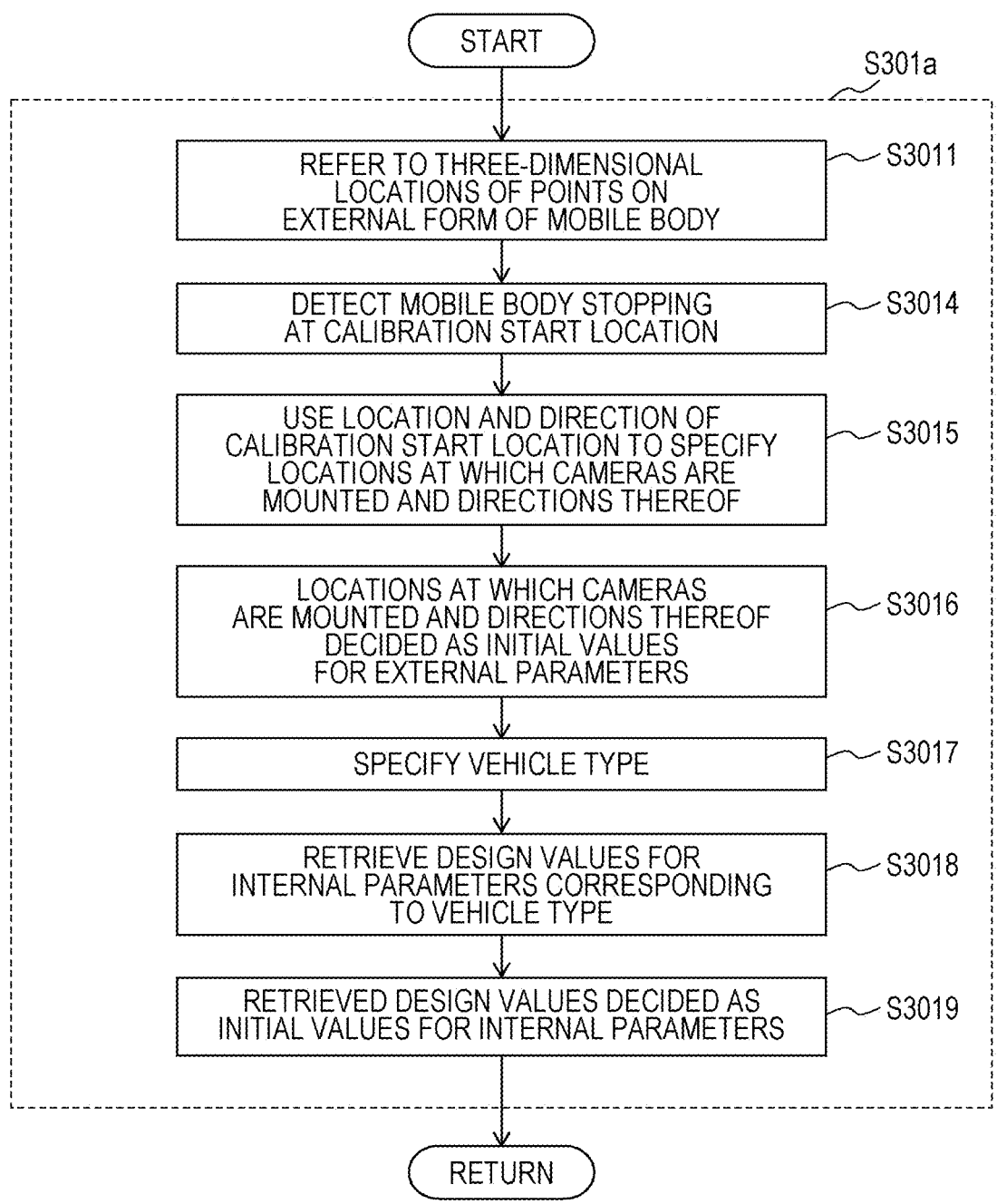
FIG. 5 is a flowchart depicting an example of the initial camera parameter decision process according to embodiment 1.

FIG. 5 is a flowchart depicting a second detailed example of the initial camera parameter decision process.

Figure 6:
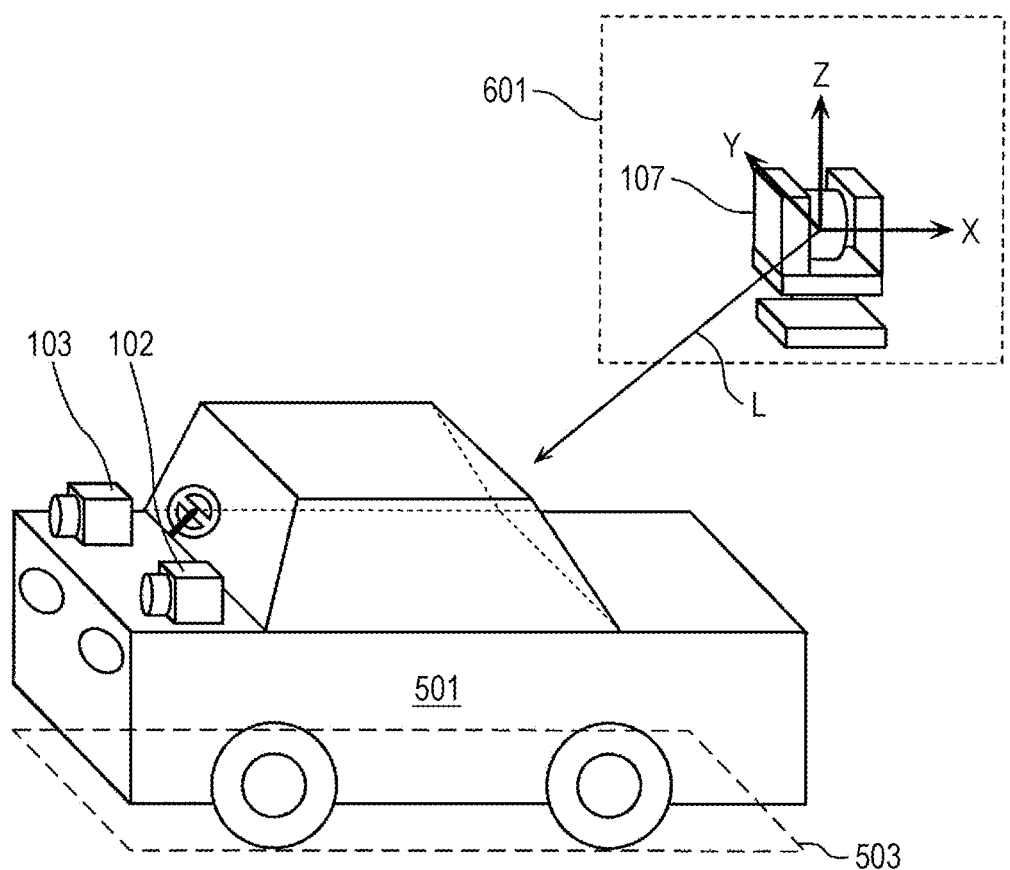
FIG. 6 is a schematic diagram depicting an application example of the initial camera parameter decision process according to embodiment 1.

FIG. 6 is a schematic diagram depicting an application example of the initial camera parameter decision process of FIG. 5.

An initial camera parameter decision process S301a of FIG. 5 is configured by changing steps S3012 and S3013 of the initial camera parameter decision process S301 of FIG. 3 to steps S3014 and S3015. Other steps of the initial camera parameter decision process S301a are the same as the corresponding steps of the initial camera parameter decision process S301, and therefore the same reference characters are appended thereto and descriptions thereof are omitted.

The initial camera parameter decider 111 detects the mobile body 501 stopping at a calibration start location 503 (S3014). The method for detecting stopping is not particularly restricted; however, for example, the mobile body 501 stopping at the calibration start location 503 may be detected by a point on the external form of the mobile body 501 referred to in step S3011 being present within the calibration start location 503. Furthermore, a detector such as a loop coil (not depicted) may be provided at the calibration start location, and the mobile body 501 stopping at the calibration start location 503 may be detected by means of a reaction of the detector.

The initial camera parameter decider 111 uses the location and the direction of the calibration start location 503 to specify the mounting locations and directions of the left camera 102 and the right camera 103 in the world coordinate space that is based on the three-dimensional laser scanner 107 (S3015). The mounting locations and directions of the left camera 102 and the right camera 103 that have been specified are then decided as the translation T and the rotation R of expression 1 (S3016).

In this way, by means of the initial camera parameter decision process S301a, initial values for the camera parameters can be decided without including a manual operation.

The description of the camera parameter calculation process (S302 to S307) will be continued with reference to FIG. 2 once again.

The camera parameter calculator 113 receives the first image captured by the left camera 102 stored in the frame memory 104, and the second image captured by the right camera 103 stored in the frame memory 104 (S301). Hereinafter, images captured by the cameras and received from the cameras are also referred to as captured images or camera images.

The point group data receiver 108 receives three-dimensional point group data indicating the three-dimensional locations of the N number of calibration points measured by the three-dimensional laser scanner 107. The camera parameter calculator 113 receives the three-dimensional point group data from the point group data receiver 108 (S303).

The camera parameter calculator 113 uses expressions 1 and 2 to calculate image coordinate pairs $(x_{Lk}, y_{Lk})$ and $(x_{Rk}, y_{Rk})$ from a world coordinate set (X, Y, Z) that is a three-dimensional coordinate set included in the three-dimensional point group data. The coordinate pair $(x_{Lk}, y_{Lk})$ is an image coordinate pair of the $k^{th}$ corresponding point included in the first image corresponding to the $k^{th}$ three-dimensional point, and the coordinate pair $(x_{Rk}, y_{Rk})$ is an image coordinate pair of the $k^{th}$ corresponding point included in the second image corresponding to the $k^{th}$ three-dimensional point.

An evaluation function J (expression 3) is calculated (S304), the evaluation function J being defined by using the sum of the absolute values of the differences. Each of the absolute values of the differences is provided between the pixel value of a point included in the first image corresponding to the $k^{th}$ three-dimensional point included in the three-dimensional points obtained by the three-dimensional laser scanner 107, namely the $k^{th}$ corresponding point included in the first image corresponding to the $k^{th}$ three-dimensional point, and the pixel value of a point included in the second image corresponding to the $k^{th}$ three-dimensional point, namely the $k^{th}$ corresponding point included in the second image corresponding to the $k^{th}$ three-dimensional point.

$$J = \frac{1}{N}\sum_{k=1}^{N} |I_L(x_{Lk}, y_{Lk}) - I_R(x_{Rk}, y_{Rk})| \qquad \text{(Expression 3)}$$

Here, N is the number of three-dimensional points at which pixel values are compared, and all or some of the points obtained by the three-dimensional laser scanner are selected. "Some . . . are selected" may mean that regions which have the same values due to continuous pixel values in the images and which do not affect the calculation of an evaluation value J are excluded, for example.

$I_L(x, y)$ is a pixel value at the image coordinate pair (x, y) of the first image, and $I_R(x, y)$ is a pixel value at the image coordinate pair (x, y) of the second image. The pixel values are luminance values in the case where the first image and the second image are monochrome images, and the pixel values are color vectors in the case where the first image and the second image are color images. It should be noted that the absolute value of the difference between color vectors means the distance between color vectors. In order to eliminate the effect of chromatic aberration, the components of one specific color may be used from among the color components making up a color vector.

Each of the three-dimensional points included in the three-dimensional point group data is projected onto the first image using the camera parameters of the left camera 102, and is projected onto the second image using the camera parameters of the right camera 103.

Here, projecting refers to calculating and obtaining a corresponding point in a camera image on the basis of a three-dimensional point, specifically, calculating an image coordinate pair in the first image by carrying out a coordinate conversion using the camera parameters of the left camera 102, and/or calculating an image coordinate pair in the second image by carrying out a coordinate conversion using the camera parameters of the right camera 103, on the basis of a world coordinate set that is a three-dimensional coordinate set for a three-dimensional point included in the three-dimensional point group data. Expression 1 may be used for the coordinate conversion, for example. The image coordinate pairs may be calculated with sub-pixel precision, and for image coordinate pairs of this sub-pixel precision, pixel values may be calculated with decimal precision from an interpolation calculation such as a bilinear or bicubic interpolation calculation.

Furthermore, in the calculation of the evaluation value J, a weighting may be applied to the absolute value of the difference between pixel values. For example, the weighting for a pixel value of a point included in a point group in which the color of the subject continuously changes is made heavier, or the weighting for a pixel value of a point included in a point group in which the surface of an object is considerably uneven is made lighter. These weightings make changes in the evaluation value J smooth and facilitate minimization of the evaluation value J with respect to continuous changes in camera parameters.

In the case where the calculation of the evaluation value J within a search range for the camera parameters is completed or the evaluation value J is smaller than a threshold value, the iterative calculation ends (end in S305). However, in the case where the iterative calculation is to continue (continue in step S305), the camera parameters are changed within the search range (S306). A range in which camera parameters can be obtained is set in advance as the search range for the camera parameters. For example, it is sufficient for the image center location $C_x$, $C_y$, the focal length f, and the imaging element length $d'_x$, $d'_y$ to each be ±5% of the design values. Furthermore, for rotation components $R_x$, $R_y$, $R_z$ of the camera location and translational movement components $T_x$, $T_y$, $T_z$, it is sufficient for the positional relationship between the three-dimensional laser scanner 107, the left camera 102, and the right camera 103 to be measured using a scale or the like, and for the angle to be ±10 degrees of the measurement value and the translational movement to be ±0.2 m.

It should be noted that in order to reduce the calculation time for the iterative processing in steps S304 to S306, the range may be limited to the vicinity of the initial camera parameters, and the steepest descent method or the like may be applied using the gradient of the evaluation function.

Lastly, camera parameters having the lowest evaluation values are selected from sets of camera parameters and evaluation values calculated by means of the iterative calculation of the aforementioned steps S304 to S306, and the selected camera parameters are output (S307).

It being possible to calibrate a camera in accordance with this kind of procedure will be described in steps. In the evaluation function for calibrating a camera, it is necessary for the evaluation values to be the smallest at the correct camera parameter. Due to this property of the evaluation function, by minimizing the evaluation values, it becomes possible to search for the correct camera parameter.

From all of the correct camera parameters, the value of only one camera parameter is changed. At such time, if the evaluation values J for all of the camera parameters have a downward-convex function form in which the correct camera parameter is minimized, the evaluation function J is downwardly convex with respect to all of the camera parameters. Here, calculating an extreme value with the value of one camera parameter λ being changed corresponds to a partial derivative $\delta J/\delta \lambda$, and all partial derivatives becoming 0 at a certain point corresponds to a total derivative $dJ/d\Omega$ of the entire function being 0 (expression 4).

$$\frac{dJ}{d\Omega} = \frac{\partial J}{\partial \lambda_1}\frac{\partial \lambda_1}{\partial \Omega} + \frac{\partial J}{\partial \lambda_2}\frac{\partial \lambda_2}{\partial \Omega} + \ldots + \frac{\partial J}{\partial \lambda_m}\frac{\partial \lambda_m}{\partial \Omega} = 0 \quad \text{(Expression 4)}$$

Here, m represents the number of camera parameters, $\lambda_1$ to $\lambda_m$ represent individual camera parameters for focal length and the like, and $\Omega$ represents the entirety of the camera parameters in which the individual camera parameters are combined.

Since camera parameters are different according to the camera model, an example will be described using the 10 camera parameters used in the Tsai scheme given in Roger Y. Tsai, "A Versatile Camera Calibration Technique for High-Accuracy 3D Machine Vision Metrology Using Off-The-Shelf TV Cameras and Lenses", IEEE Journal of Robotics and Automation, Vol. 3, pp. 323-344, 1987. For the camera parameters of this pinhole camera model, the x component and y component in the center of an image are taken as $C_x$ and $C_y$, the focal length is taken as f, the length in the x direction of one imaging element is taken as $d'_x$, the x, y, and z components of rotation for reference for the world coordinate space for the camera are respectively taken as $R_x$, $R_y$, and $R_z$, and the x, y, and z components of a translation for reference for the world coordinate space for the camera are respectively taken as $T_x$, $T_y$, and $T_z$. At such time, the evaluation value J becomes a function in which these 10 camera parameters are variables.

The present scheme can be carried out by imaging an actual space, or can be carried out using CG data. Hereinafter, camera calibration carried out using CG data will be described as an example.

Figure 7:
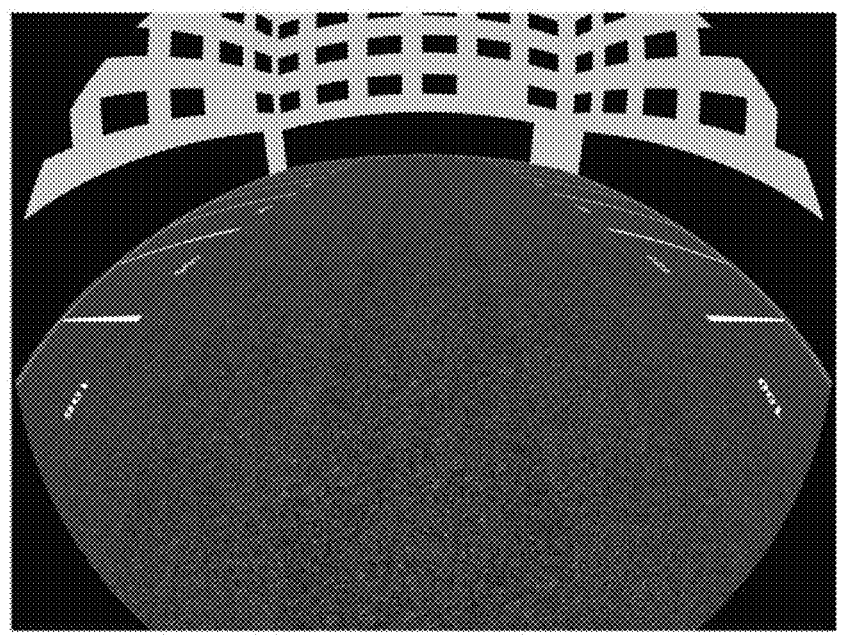
FIG. 7 is a drawing depicting an example of a computer graphics (CG) image according to embodiment 1.
Figure 8:
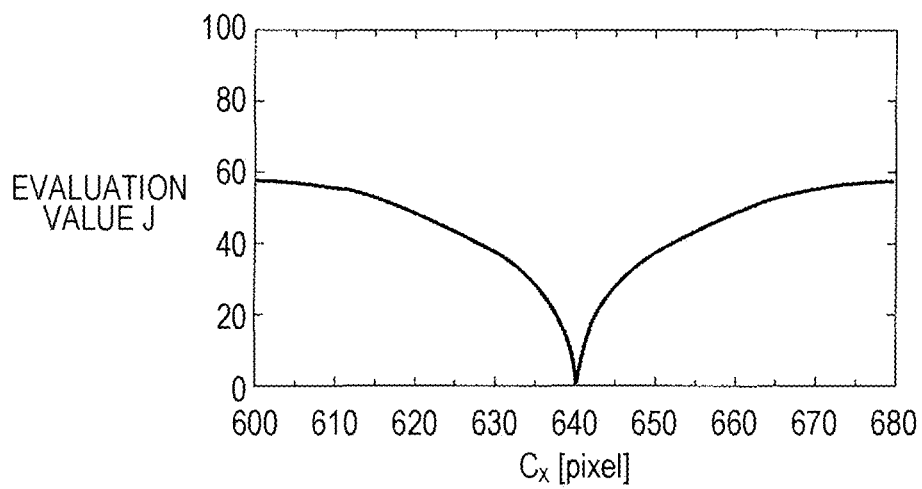
FIG. 8 is a drawing depicting evaluation values in the vicinity of a correct camera parameter for $C_x$.
Figure 9:
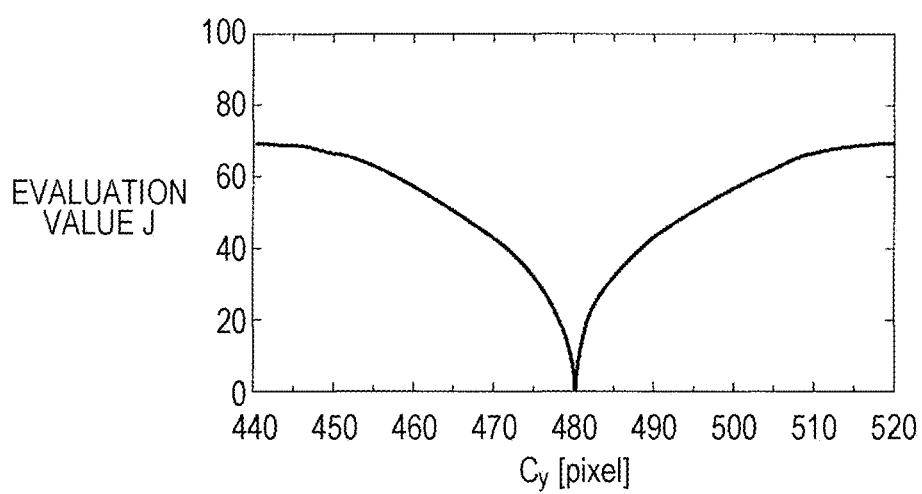
FIG. 9 is a drawing depicting evaluation values in the vicinity of a correct camera parameter for $C_y$.
Figure 10:
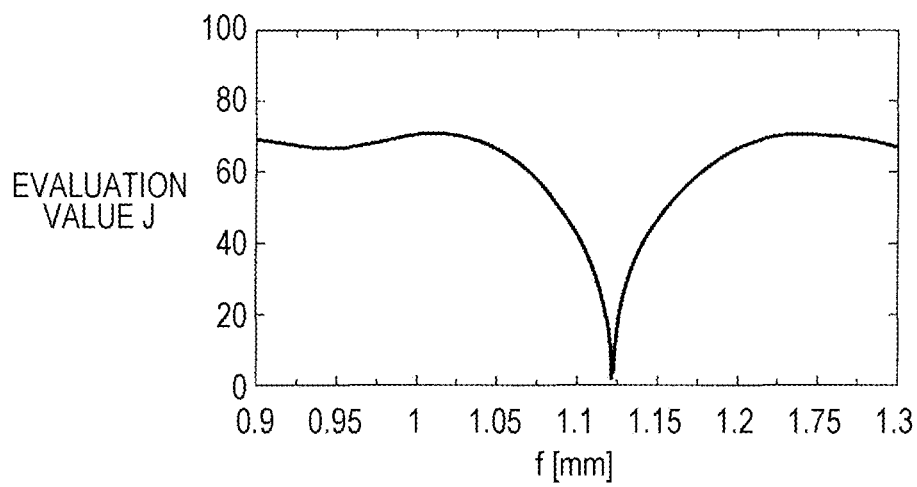
FIG. 10 is a drawing depicting evaluation values in the vicinity of a correct camera parameter for f.
Figure 11:
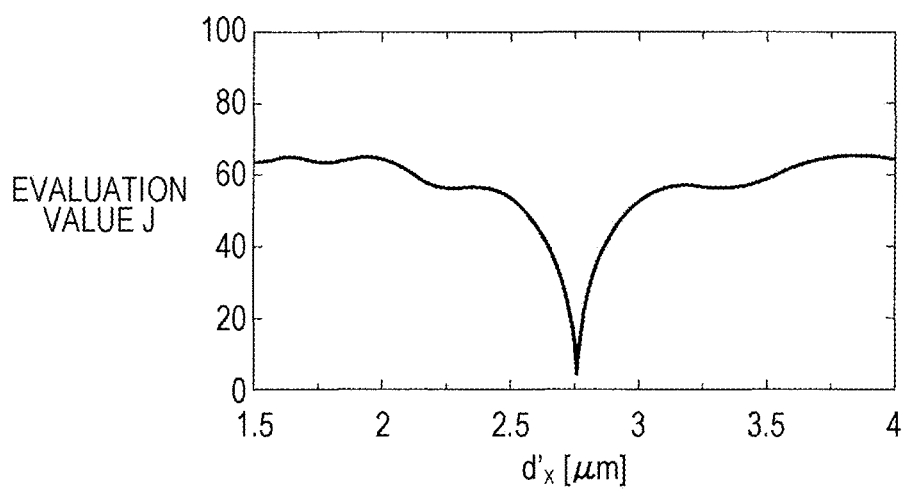
FIG. 11 is a drawing depicting evaluation values in the vicinity of a correct camera parameter for $d'_x$.
Figure 12:
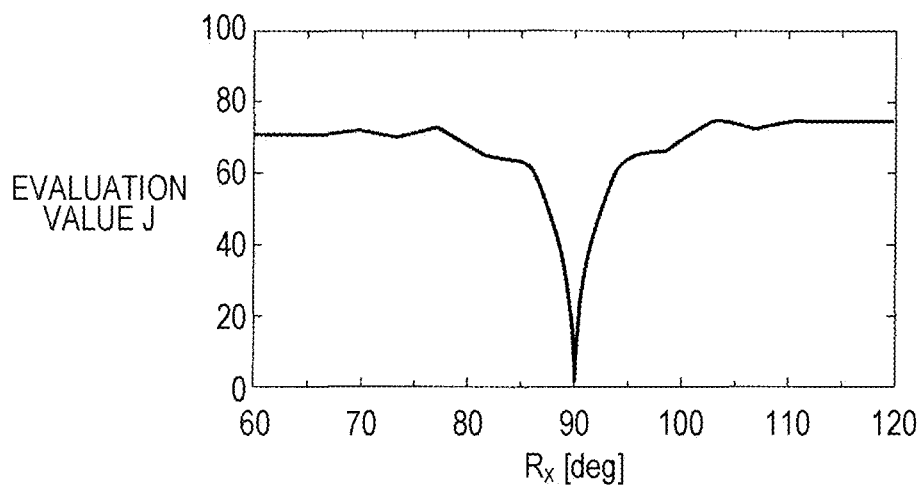
FIG. 12 is a drawing depicting evaluation values in the vicinity of a correct camera parameter for $R_x$.
Figure 13:
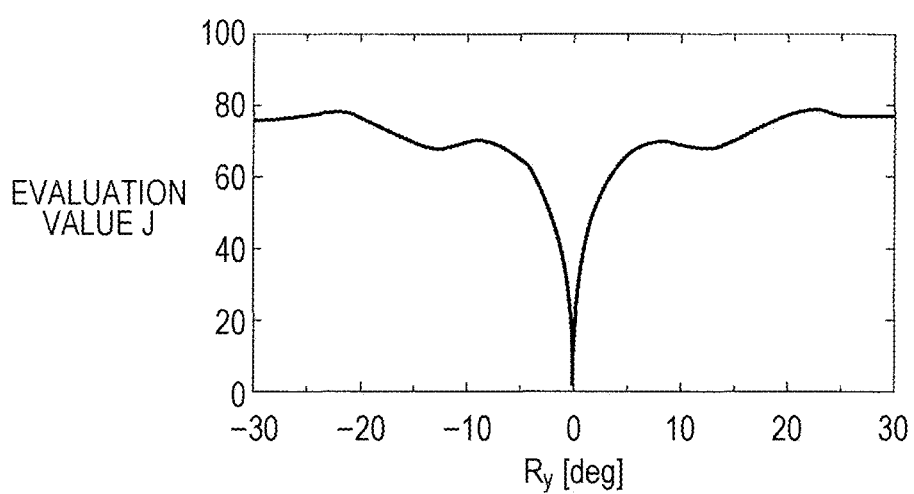
FIG. 13 is a drawing depicting evaluation values in the vicinity of a correct camera parameter for $R_y$.
Figure 14:
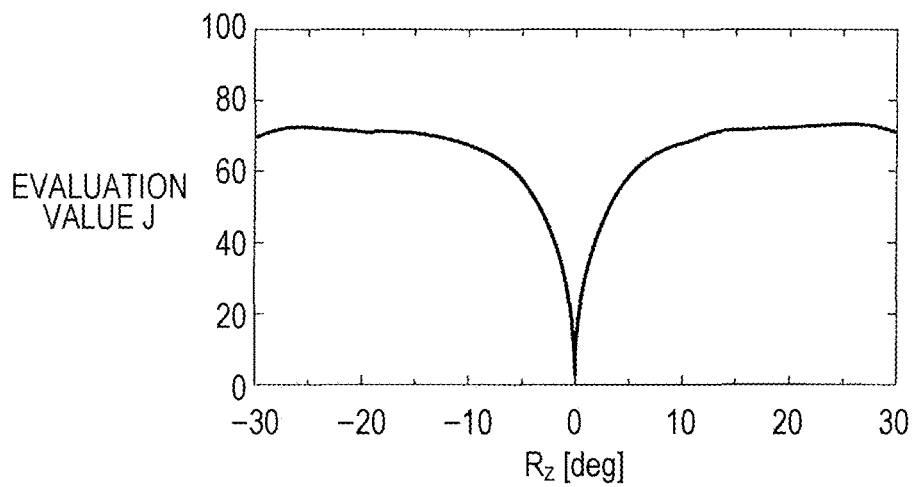
FIG. 14 is a drawing depicting evaluation values in the vicinity of a correct camera parameter for $R_z$.
Figure 15:
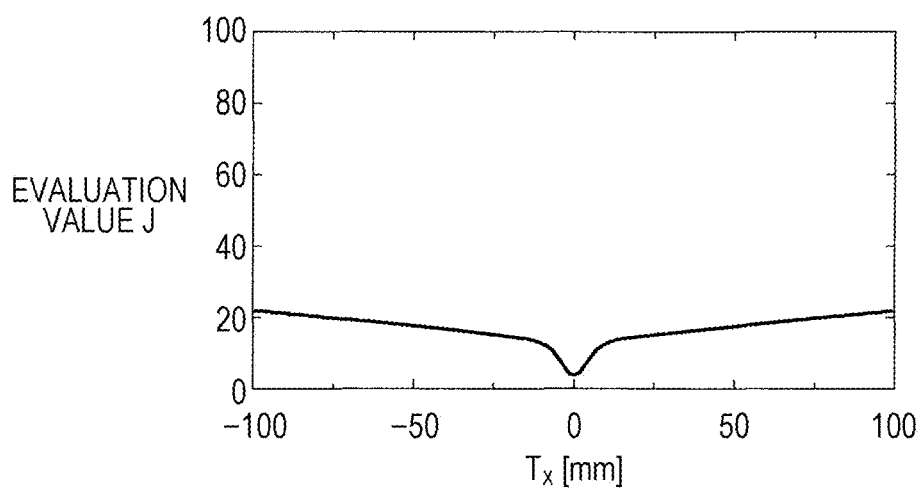
FIG. 15 is a drawing depicting evaluation values in the vicinity of a correct camera parameter for FIG. 16 is a drawing depicting evaluation values in the vicinity of a correct camera parameter for $T_y$.
Figure 16:
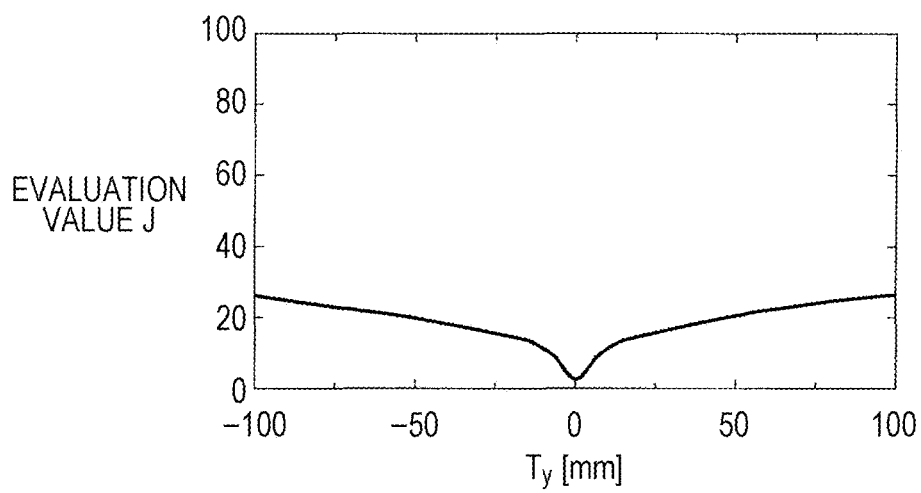
Figure 17:
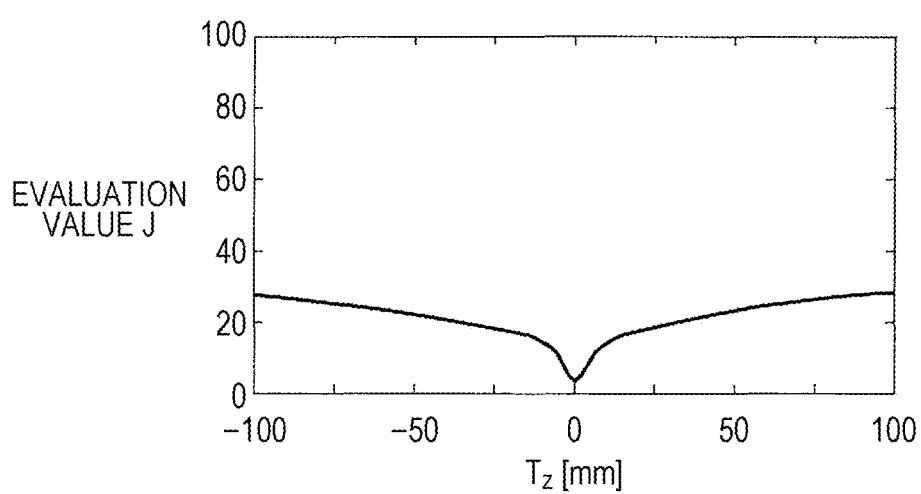
FIG. 17 is a drawing depicting evaluation values in the vicinity of a correct camera parameter for $T_z$.

CG mimicking a parking lot depicted in FIG. 7 is created. The right camera is separated 15 mm horizontally from the left camera, and the optical axis of the right camera is parallel with that of the left camera. Furthermore, it is assumed that the cameras are fish-eye cameras.

Evaluation values J obtained when one camera parameter of the right camera is changed from a state in which the values of all of the camera parameters are correct are calculated with respect to the aforementioned CG model. These evaluation values J are depicted in FIGS. 8 to 17 for 10 camera parameters in which the horizontal axes indicate camera parameter values and the vertical axes indicate evaluation values J. The camera parameters that are changed are $C_x$ in FIG. 8, $C_y$ in FIG. 9, f in FIG. 10, $d'_x$ in FIG. 11, $R_x$ in FIG. 12, $R_y$ in FIG. 13, $R_z$ in FIG. 14, $T_x$ in FIG. 15, $T_y$ in FIG. 16, and $T_z$ in FIG. 17. Furthermore, the correct values for each camera parameter are as follows. More specifically, $C_x$ is 640 pixels, $C_y$ is 480 pixels, f is 1.12 mm, $d'_x$ is 2.75 m, $R_x$ is 90°, $R_y$ is 00, $R_z$ is 0°, $T_x$ is 0 mm, $T_y$ is 0 mm, and $T_z$ is 0 mm.

In each of FIGS. 8 to 17, the evaluation values J are downwardly convex in the vicinity of the correct camera parameter, and the correct camera parameter coincides with the camera parameter with which the evaluation value J is minimized.

Based on the above, camera calibration is possible with the present scheme.

It should be noted that in the case where there are three or more cameras, the evaluation function J of expression 3 may be expanded to expression 5 with the number of cameras as n.

$$J = \frac{1}{N \cdot {}_nC_2} \sum_{i=1}^{n} \sum_{j=1}^{n} \sum_{k=1}^{N} |I_i(x_{ik}, y_{ik}) - I_j(x_{jk}, y_{jk})| \quad \text{(Expression 5)}$$

Here, the image coordinate pair of the $k^m$ corresponding point included in an $i^{th}$ camera image is taken as the image coordinate pair $(x_{ik}, y_{ik})$, and the image coordinate pair of the $k^{th}$ corresponding point included in a $j^{th}$ camera image is taken as the image coordinate pair $(x_{jk}, y_{jk})$. $I_i(x, y)$ represents a pixel value for an RGB value or a luminance value at an image coordinate pair (x, y) of the $i^{th}$ camera image, and $I_j(x, y)$ represents a pixel value for an RGB value or a luminance value at an image coordinate pair (x, y) of the $j^{th}$ camera image. The other variables are the same as the variables included in expression 3, and therefore a description thereof has been omitted.

As mentioned above, camera parameters are evaluated based on pixel values at image coordinate pairs obtained by projecting three-dimensional coordinate sets onto an image using the camera parameters, and therefore the camera parameters can be calculated, namely a camera can be calibrated, without using a calibration index having a known three-dimensional structure. A camera can therefore be calibrated without associating three-dimensional coordinate sets in a three-dimensional space and pixel locations in a two-dimensional image.

Embodiment 2

In embodiment 1, an example was given in which the camera parameter calculation apparatus is realized by means of a distributed processing system provided distributed between a mobile body and a server; however, the configuration of the camera parameter calculation apparatus is not restricted to this example. The camera parameter calculation apparatus may be realized as a terminal apparatus provided in a mobile body, for example.

Figure 18:
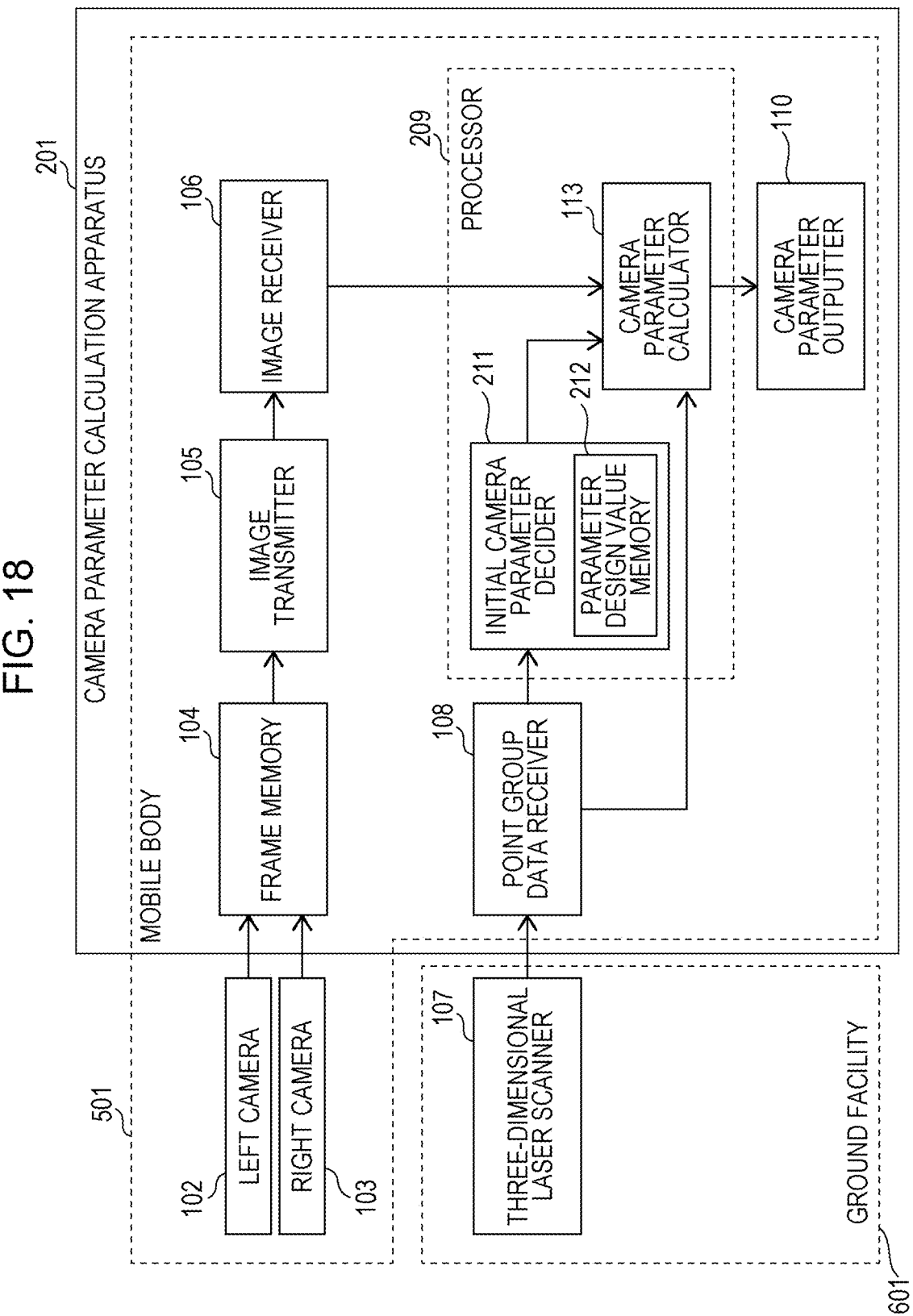
FIG. 18 is a block diagram depicting an example of the functional configuration of a camera parameter calculation apparatus according to embodiment 2.

FIG. 18 is a block diagram depicting an example of the functional configuration of this kind of camera parameter calculation apparatus 201. In the camera parameter calculation apparatus 201 of FIG. 18, the functions of a processor 209 and an initial camera parameter decider 211 realized by means of the processor 209 (in particular, the function of deciding initial values for the internal parameters) are altered compared to the camera parameter calculation apparatus 101 of FIG. 1.

Hereinafter, differences with the camera parameter calculation apparatus 101 will be mainly described with descriptions of matters common to the camera parameter calculation apparatus 101 being omitted.

The processor 209 may be a microcomputer mounted in the mobile body 501, for example. The processor 209 functions as the initial camera parameter decider 211 and the camera parameter calculator 113 by executing programs stored in advance in a memory. It should be noted that the initial camera parameter decider 211 and the camera parameter calculator 113 are not restricted to software functions realized by means of the processor 209, and may be configured by means of dedicated hardware circuits (not depicted).

The camera parameter calculation apparatus 201 is mounted in a specific mobile body 501 (hereinafter referred to as the host vehicle), and it is therefore sufficient for the initial camera parameter decider 211 to decide initial values for camera parameters for use in the host vehicle, which is different from the initial camera parameter decider 111.

Therefore, the initial camera parameter decider 211 can retain design values for internal parameters for use in the host vehicle in a parameter design value memory 212, and the design values retained in the parameter design value memory 212 can be used in a fixed manner as the initial values for the internal parameters.

Thus, step S3017 for specifying the vehicle type and step S3018 for searching the vehicle type database are omitted in the initial camera parameter decision process carried out by the initial camera parameter decider 211.

It should be noted that, similar to the initial camera parameter decider 111, the initial values for the external parameters are also decided in the initial camera parameter decider 211 on the basis of the measurement of the location and the direction of the mobile body 501 by the three-dimensional laser scanner 107.

In this way, by means of the initial camera parameter decider 211, initial values for the camera parameters can be decided without including a manual operation.

Embodiment 3

In embodiments 1 and 2, examples in which a three-dimensional laser scanner is included in a ground facility were given; however, the arrangement of a three-dimensional laser scanner is not restricted to these examples. For example, a three-dimensional laser scanner may be mounted on a mobile body.

Figure 19:
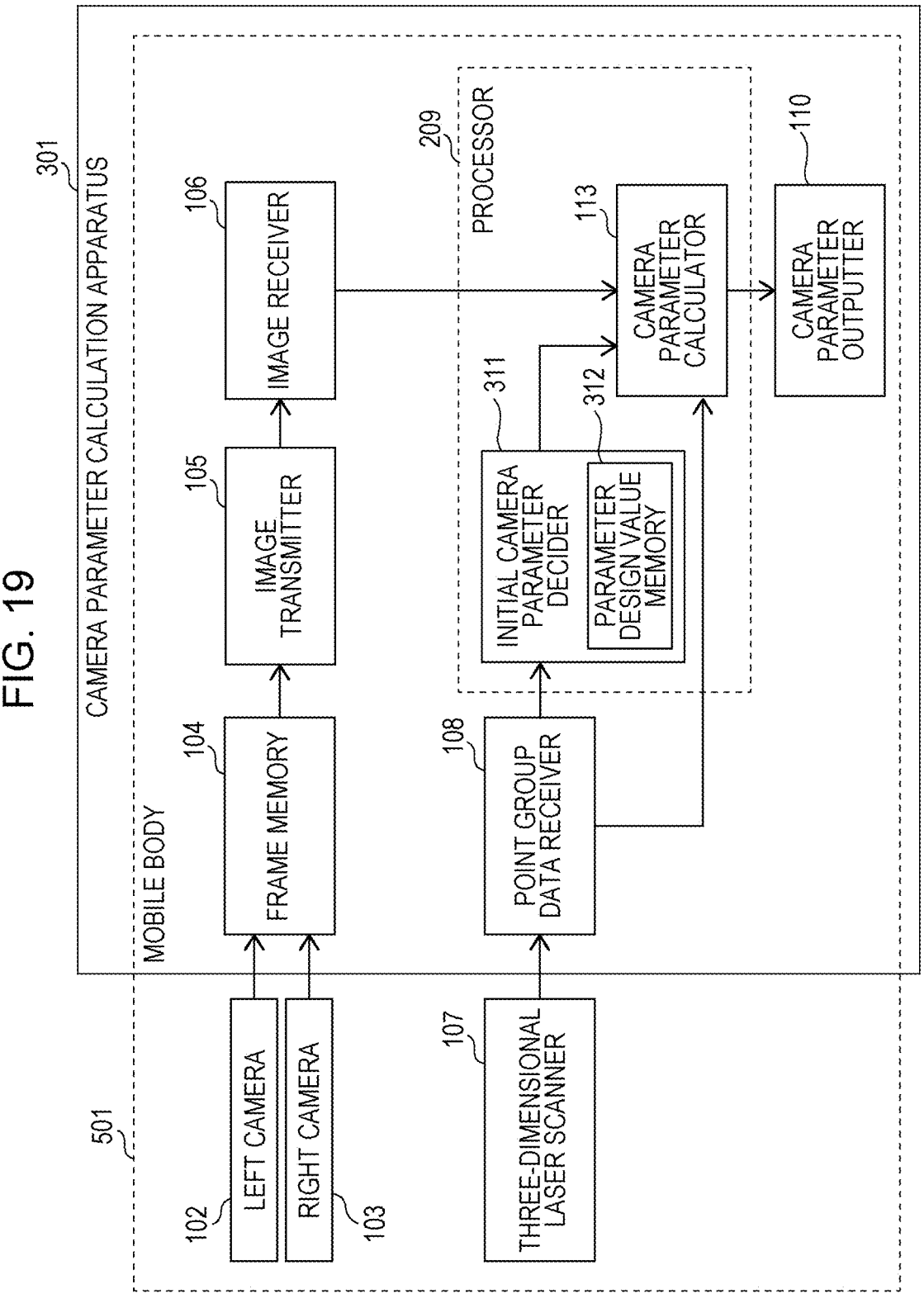
FIG. 19 is a block diagram depicting an example of the functional configuration of a camera parameter calculation apparatus according to embodiment 3.

FIG. 19 is a block diagram depicting an example of the functional configuration of this kind of camera parameter calculation apparatus 301. Compared to the camera parameter calculation apparatus 201 of FIG. 18, the camera parameter calculation apparatus 301 of FIG. 19 is different in that the three-dimensional laser scanner 107 is mounted on the mobile body 501.

Hereinafter, with regard to the camera parameter calculation apparatus 301, differences with the camera parameter calculation apparatus 201 will be mainly described with descriptions of matters common to the camera parameter calculation apparatus 201 being omitted.

Figure 20:
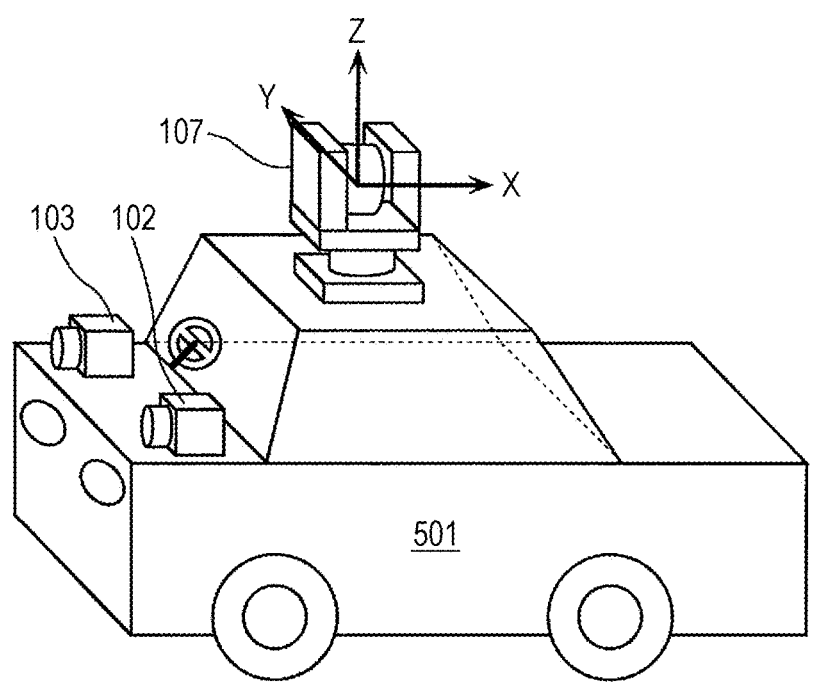
FIG. 20 is a schematic diagram depicting an application example of the camera parameter calculation apparatus according to embodiment 3.

FIG. 20 is a schematic diagram depicting an application example of the camera parameter calculation apparatus 301 of FIG. 19. As depicted in FIG. 20, the three-dimensional laser scanner 107 is mounted in a fixed manner on the mobile body 501. Therefore, the world coordinate space that is based on the three-dimensional laser scanner 107 is fixed to the mobile body 501 and moves together with the mobile body 501. The three-dimensional laser scanner 107 is mounted on the roof of the mobile body 501, for example.

Consequently, in embodiment 3, the mounting locations and directions of the left camera 102 and the right camera 103 installed on the mobile body 501 in the world coordinate space are always fixed regardless of the movement of the mobile body 501. In other words, in embodiments 1 and 2, the translation T and the rotation R were described as external parameters; however, in embodiment 3, these are processed as internal parameters, and it is not necessary to measure the location and the direction of the mobile body 501 in the world coordinate space in order to decide initial values for the translation T and the rotation R.

Thus, in an initial camera parameter decider 311, design values for the mounting locations and directions of the left camera 102 and the right camera 103 are retained in a parameter design value memory 312 together with design values for other internal parameters. The design values for the mounting locations and directions of the left camera 102 and the right camera 103 are represented by means of the displacement and rotation from the mounting location and the direction of the three-dimensional laser scanner 107, for example. The design values for the mounting locations and directions of the left camera 102 and the right camera 103 are then used as initial values for the translation T and the rotation R. The design values for other internal parameters are also similarly used as initial values.

In this way, by means of the initial camera parameter decider 311, initial values for the camera parameters can be acquired without including a manual operation.

Several modifications for the initial camera parameter decision process have been described; however, various modifications are also feasible for the camera parameter decision process.

Hereinafter, modified examples of the details of the camera parameter calculation process will be described. The modified examples hereinafter can be combined with any one of embodiments 1 to 3.

Modified Example 1

It is not necessary for the evaluation function in the embodiments to be restricted to the absolute value sum of the differences between pixel values indicated in expression 3. In modified example 1, the case where the evaluation function is the square sum of the differences between pixel values will be described.

In modified example 1, the evaluation function used for calculating evaluation values is different compared to the embodiments. The functional configuration of the camera parameter calculation apparatus according to modified example 1 is substantially the same as that of the camera parameter calculation apparatus 101 described in the embodiments, and therefore a description thereof has been omitted.

Figure 21:
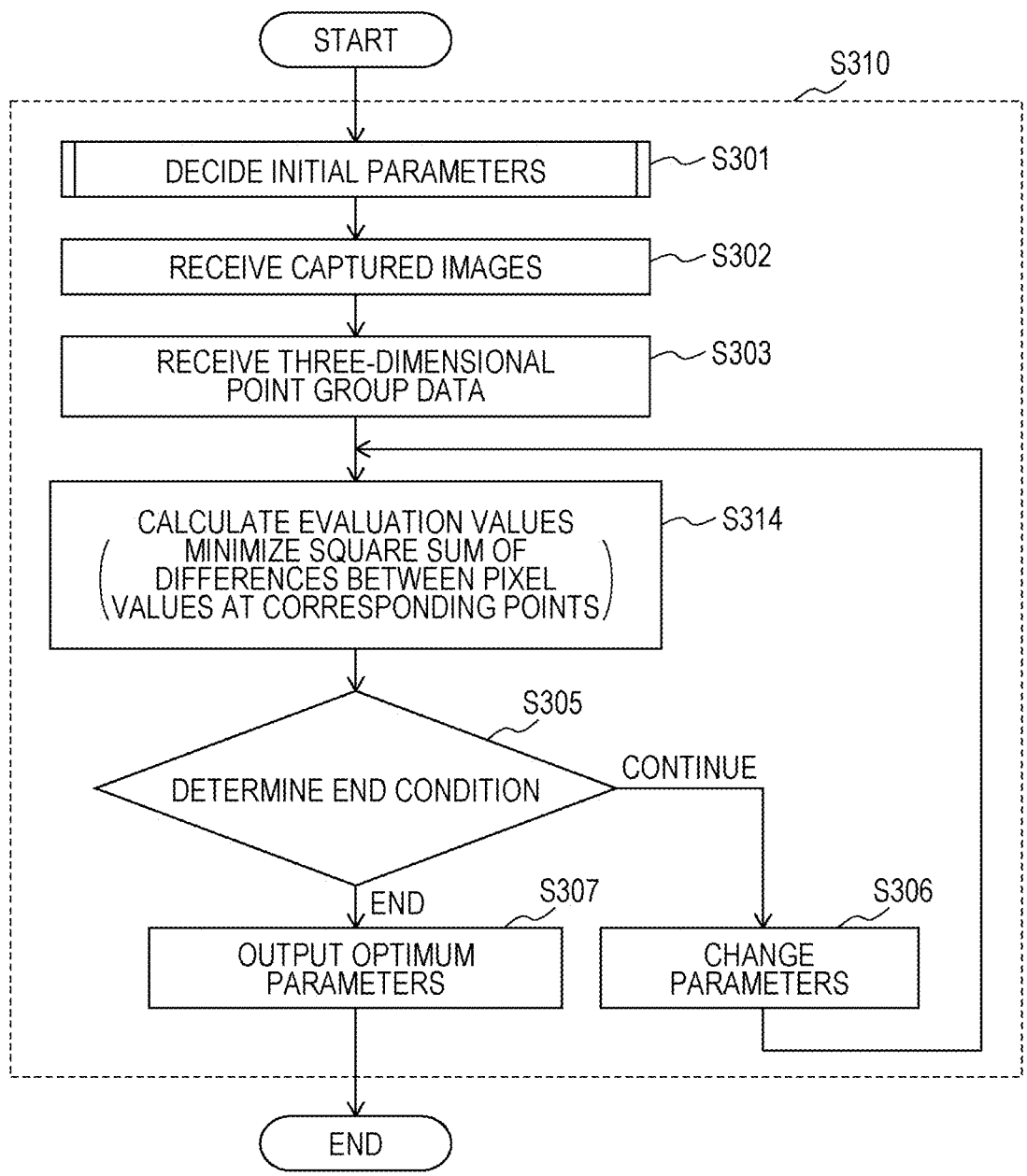
FIG. 21 is a flowchart depicting an example of an operation of a camera parameter calculation apparatus according to modified example 1.

FIG. 21 is a flowchart depicting an example of a camera parameter calculation process S310 according to modified example 1. In FIG. 21, the same steps as in the embodiments are denoted by the same step names as in FIG. 2, and descriptions thereof have been omitted. Step S314 calculates an evaluation function J (expression 6) defined by the square sum of the differences between corresponding pixel values of a stereo camera.

$$J = \frac{1}{N} \sum_{k=1}^{N} (I_L(x_{Lk}, y_{LK}) - I_R(x_{Rk}, y_{Rk}))^2 \qquad \text{(Expression 6)}$$

Here, the variables of expression 6 are the same as the variables included in expression 3, and therefore a description thereof has been omitted.

It should be noted that in the case where there are three or more cameras, the evaluation function J of expression 6 may be expanded to expression 7.

$$J = \frac{1}{N \cdot {}_nC_2} \sum_{i=1}^{n} \sum_{j=1}^{n} \sum_{k=1}^{N} (I_i(x_{ik}, y_{ik}) - I_j(x_{jk}, y_{jk}))^2 \qquad \text{(Expression 7)}$$

Here, the variables of expression 7 are the same as the variables included in expression 5, and therefore a description thereof has been omitted.

As mentioned above, similar to the embodiments, a camera can be calibrated without associating three-dimensional coordinate sets in a three-dimensional space and pixel locations in a two-dimensional image.

Modified Example 2

It is not necessary for the evaluation functions in the embodiments to be restricted to the absolute value sum or the square sum of the differences between pixel values indicated in expressions 3 and 6. In modified example 2, the case where the evaluation function is the absolute value sum of the differences with an average pixel value will be described.

In modified example 2, the evaluation function for calculating evaluation values is different compared to the embodiments. The functional configuration of the camera parameter calculation apparatus according to modified example 2 is substantially the same as that of the camera parameter calculation apparatus 101 described in the embodiments, and therefore a description thereof has been omitted.

Figure 22:
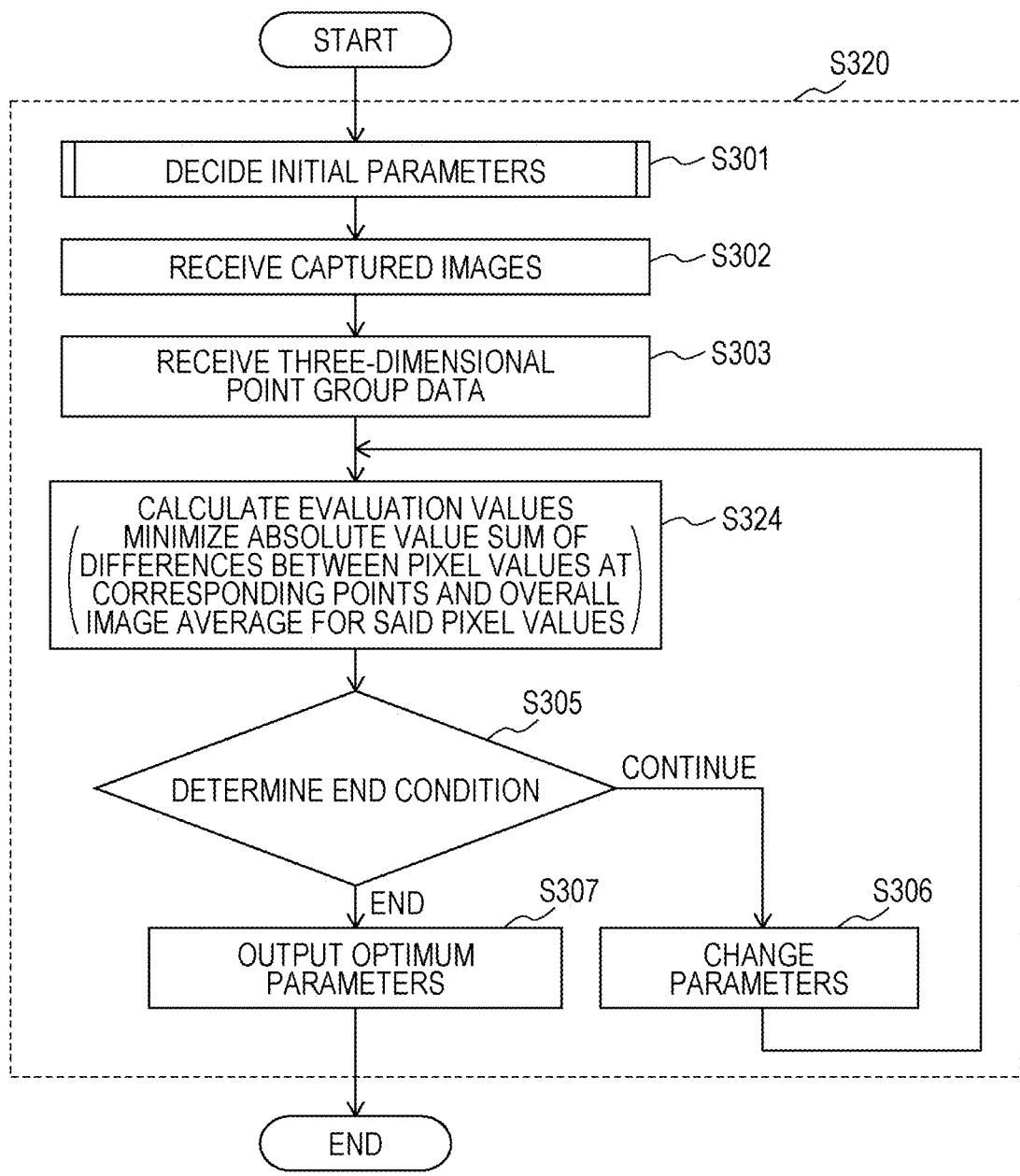
FIG. 22 is a flowchart depicting an example of a camera parameter calculation process according to modified example 2.

FIG. 22 is a flowchart depicting an example of a camera parameter calculation process S320 according to modified example 2. In FIG. 22, the same steps as in embodiment 1 are denoted by the same step names as in FIG. 2, and descriptions thereof have been omitted. Step S324 calculates an evaluation function J (expression 8) defined by the absolute value sum of the differences between corresponding pixel values of a stereo camera and an average pixel value.

$$J = \frac{1}{2N} \sum_{k=1}^{N} (|I_L(x_{Lk}, y_{LK}) - I'_k| + |I_R(x_{Rk}, y_{Rk}) - I'_k|) \qquad \text{(Expression 8)}$$

Here, $I'_k$ represents the average of the pixel values of the $k^{th}$ corresponding points in all camera images. The other variables are the same as the variables included in expression 3, and therefore a description thereof has been omitted.

It should be noted that in the case where there are three or more cameras, the evaluation function J of expression 8 may be expanded to expression 9.

$$J = \frac{1}{N \cdot n} \sum_{i=1}^{n} \sum_{k=1}^{N} |I_i(x_{ik}, y_{ik}) - I'_k|$$ (Expression 9)

Here, the variables of expression 9 are the same as the variables included in expressions 3 and 5, and therefore a description thereof has been omitted.

As mentioned above, similar to the embodiments, a camera can be calibrated without associating three-dimensional coordinate sets in a three-dimensional space and pixel locations in a two-dimensional image.

Modified Example 3

It is not necessary for the evaluation functions in the embodiments to be restricted to the absolute value sum or the square sum of the differences between pixel values, or the absolute value sum of the differences with an average pixel value, indicated in expressions 3, 6, and 8. In modified example 3, the case where the evaluation function is the square sum of the differences with an average pixel value will be described.

In modified example 3, the evaluation function for calculating evaluation values is different compared to the embodiments. The functional configuration of the camera parameter calculation apparatus according to modified example 3 is substantially the same as that of the camera parameter calculation apparatus 101 described in the embodiments, and therefore a description thereof has been omitted.

Figure 23:
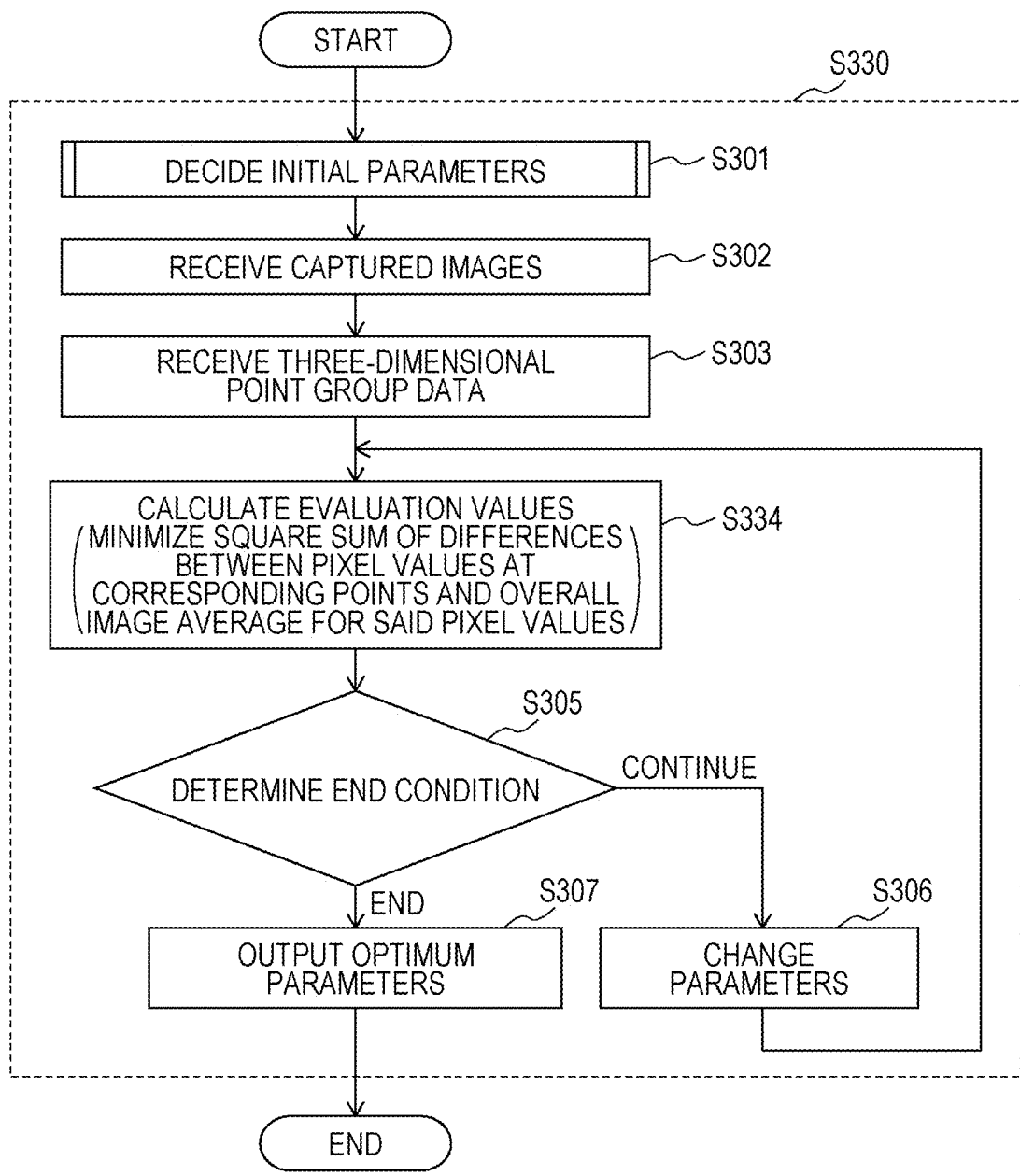
FIG. 23 is a flowchart depicting an example of a camera parameter calculation process according to modified example 3.

FIG. 23 is a flowchart depicting an example of a camera parameter calculation process S330 according to modified example 3. In FIG. 23, the same steps as in the embodiments are denoted by the same step names as in FIG. 2, and descriptions thereof have been omitted. Step S334 calculates an evaluation function J (expression 10) defined by the square sum of the differences between corresponding pixel values of a stereo camera and an average pixel value.

$$J = \frac{1}{2N} \sum_{k=1}^{N} ((I_L(x_{Lk}, y_{LK}) - I'_k)^2 + (I_R(x_{Rk}, y_{Rk}) - I'_k)^2)$$ (Expression 10)

Here, the variables of expression 10 are the same as the variables included in expression 8, and therefore a description thereof has been omitted.

It should be noted that in the case where there are three or more cameras, the evaluation function J of expression 10 may be expanded to expression 11.

$$J = \frac{1}{N \cdot n} \sum_{i=1}^{n} \sum_{k=1}^{N} (I_i(x_{ik}, y_{ik}) - I'_k)^2$$ (Expression 11)

Here, the variables of expression 11 are the same as the variables included in expressions 3 and 8, and therefore a description thereof has been omitted.

As mentioned above, similar to the embodiments, a camera can be calibrated without associating three-dimensional coordinate sets in a three-dimensional space and pixel locations in a two-dimensional image.

Modified Example 4

In modified example 4, camera parameters are calculated based on the degree of similarity between patterns in neighboring pixels of the image coordinate pairs of individual cameras corresponding to three-dimensional point group data, and the effect of a difference between pixel values $I_L(x, y)$ and $I_R(x, y)$ caused by a gain difference between cameras is thereby reduced.

Hereinafter, as a specific example, the case where the evaluation function is a normalized cross-correlation will be described.

In modified example 4, the evaluation function for calculating evaluation values is different compared to the embodiments. The functional configuration of the camera parameter calculation apparatus according to modified example 4 is substantially the same as that of the camera parameter calculation apparatus 101 described in the embodiments, and therefore a description thereof has been omitted.

Figure 24:
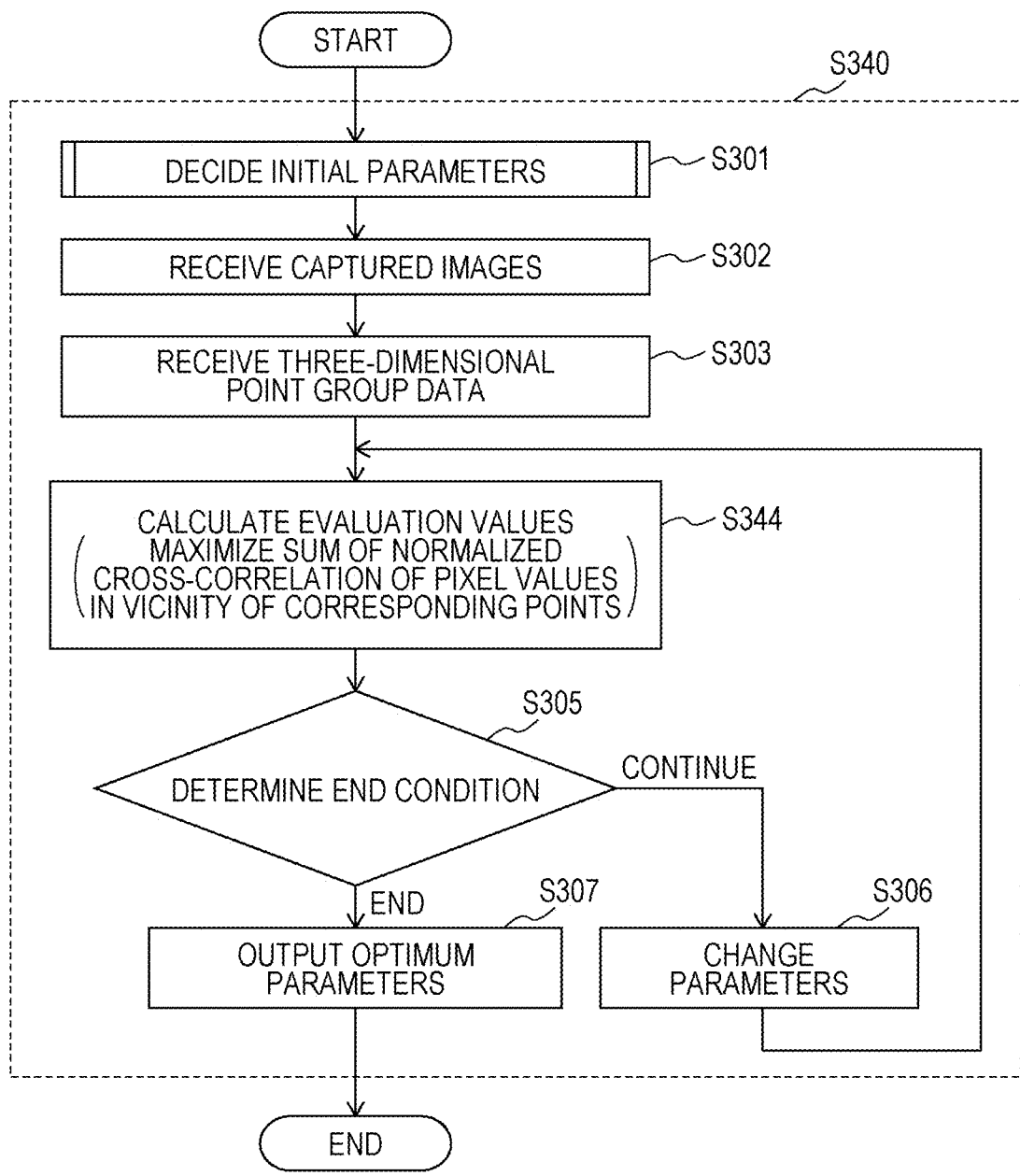
FIG. 24 is a flowchart depicting an example of a camera parameter calculation process according to modified example 4.

FIG. 24 is a flowchart depicting an example of a camera parameter calculation process S340 according to modified example 4. In FIG. 24, the same steps as in the embodiments are denoted by the same step names as in FIG. 2, and descriptions thereof have been omitted. Step S344 calculates an evaluation function J (expression 12) defined by the normalized cross-correlation of corresponding pixel values of a stereo camera.

$$J = 1 - \frac{1}{N} \sum_{k=1}^{N} \left( \frac{\sum_{i=1}^{m} M_{Lki} M_{Rki}}{\sqrt{\sum_{i=1}^{m} M_{Lki}^2 \cdot \sum_{i=1}^{m} M_{Rki}^2}} \right)$$ (Expression 12)

Here, a three-dimensional point group to be compared is projected onto camera images captured by each of a left camera and a right camera according to the respective camera parameters, and image coordinate pairs are obtained. In order to compare regions in each of the camera images, m pixels are selected from the vicinity of these image coordinate pairs. For example, pixels from within a circle in which a projected pixel is taken as the center and the radius is taken as r (for example, four pixels) are selected. The $i^{th}$ pixel values of the selected m pixels of the left camera and the right camera are taken as $M_{Lki}$ and $M_{Rki}$, respectively. The other variables are the same as the variables included in expression 3, and therefore a description thereof has been omitted.

As mentioned above, by using the normalized cross-correlation of pixel values, camera calibration can be carried out without being affected by gain differences between the left camera and the right camera.

It should be noted that in the case where there are three or more cameras, the evaluation function J of expression 12 may be expanded to expression 13.

$$J = 1 - \frac{1}{N} \sum_{k=1}^{N} \left( \frac{\sum_{i=1}^{m} \prod_{j=1}^{n} M_{jki}}{\sqrt{\prod_{j=1}^{n} \sum_{i=1}^{m} M_{jki}^2}} \right)$$ (Expression 13)

Here, N represents the number of three-dimensional points for comparing pixel values, n represents the number of cameras, and $M_{jki}$ represents the $i^{th}$ pixel value in neighboring pixels with which a normalized cross-correlation is calculated for a pixel location in the $j^{th}$ camera image corresponding to the $k^{th}$ three-dimensional point.

It should be noted that a ternary expression or a difference in pixel values between adjacent pixels may be used rather than a normalized cross-correlation.

Modified Example 5

In the embodiments, an example was given in which three-dimensional point group data to be used for evaluation is selected based on pixel values; however, it is not necessary for the basis for selection to be restricted to pixel values. In modified example 5, the case where three-dimensional point group data is selected based on a covered region will be described.

The functional configuration of the camera parameter calculation apparatus according to modified example 5 is substantially the same as that of the camera parameter calculation apparatus 101 described in the embodiments, and therefore a description thereof has been omitted.

Figure 25:
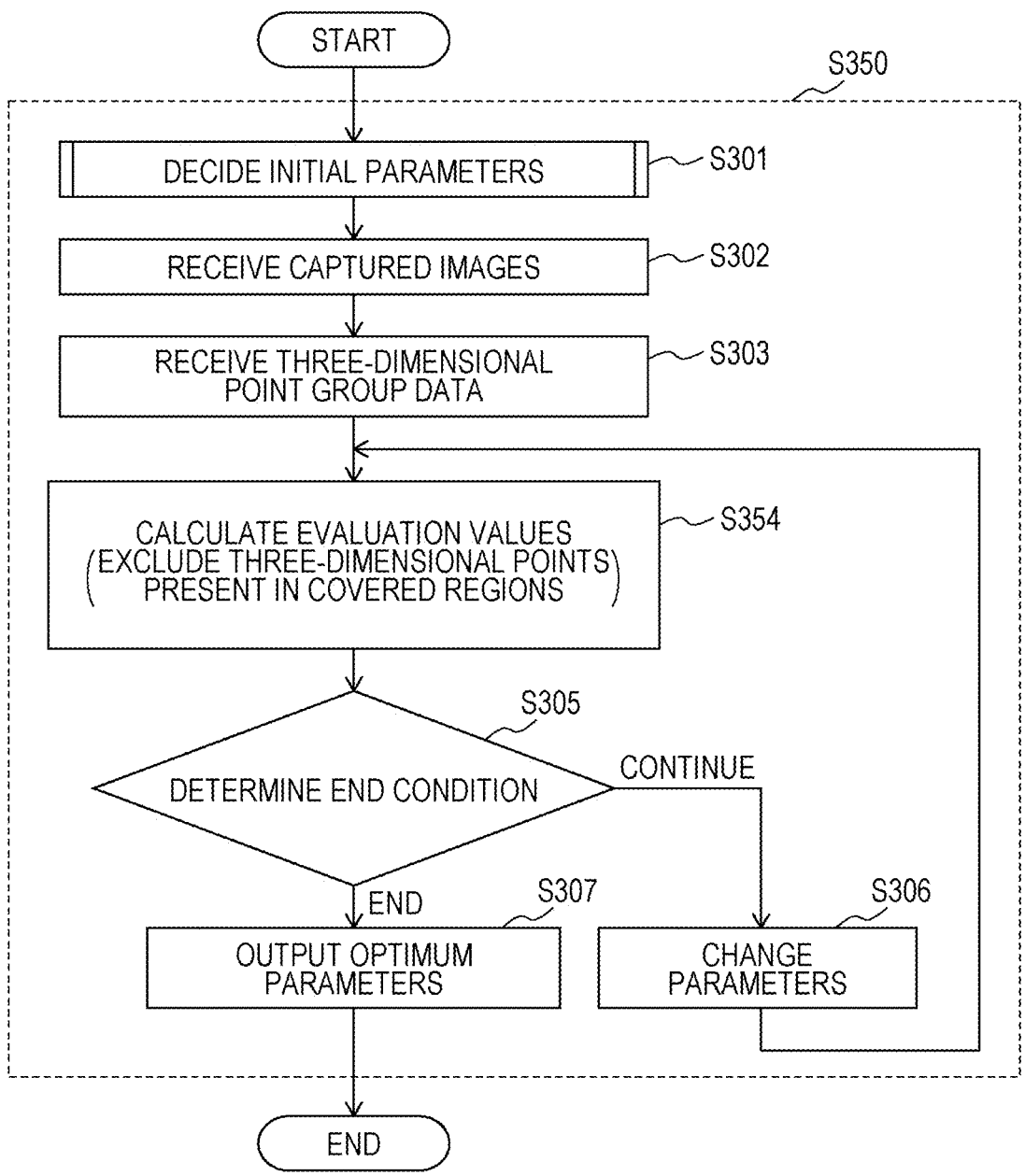
FIG. 25 is a flowchart depicting an example of a camera parameter calculation process according to modified example 5.

FIG. 25 is a flowchart depicting an example of a camera parameter calculation process S350 according to modified example 5. In FIG. 25, the same steps as in the embodiments are denoted by the same step names as in FIG. 2, and descriptions thereof have been omitted. In step S354, data of three-dimensional points that are present in at least one covered region of the left camera 102 and the right camera 103 is excluded from the three-dimensional point group data acquired in step S303. A covered region is a region in which a front three-dimensional object within the covered region covers a rear three-dimensional object, and is a region that extends in one direction from a camera. The determining of this covered region will be described.

One point within a three-dimensional space corresponds to one optical path of light incident upon a camera. Even in the case where three-dimensional objects are present side-by-side in a covered region, the three-dimensional laser scanner 107 acquires the world coordinate sets of the three-dimensional objects from viewpoints that are different from that of the camera. When the world coordinate sets are projected onto an image on the basis of the camera parameters, image coordinate pairs that are the same or have hardly any differences are calculated. That is, corresponding points having a distance of separation that is equal to or less than a threshold value are obtained in one image, and it is thereby understood that three-dimensional points are located in a covered region of the camera that captured the image. There is a possibility that the corresponding points of such three-dimensional points may represent pixel values that do not correspond to the original three-dimensional points and are therefore not appropriate for calculation of the evaluation values J.

Consequently, it is determined that sets of three-dimensional points for which the distance between image coordinate pairs projected onto the image is less than a threshold value are three-dimensional points that are present in a covered region, and evaluation values J are calculated excluding the three-dimensional points present in the covered region, according to the determination.

As mentioned above, by excluding three-dimensional points present in a covered region from the calculation of evaluation values, camera calibration can be carried out without being affected by covered regions.

Modified Example 6

In the embodiments, examples were given in which three-dimensional point group data to be used for evaluation is selected based on pixel values or a covered region; however, it is not necessary for the basis for selection to be restricted thereto. In modified example 6, a case will be described where three-dimensional point group data is selected based on the distance between two three-dimensional points with which an angle formed by measurement light of the three-dimensional laser scanner is less than a threshold value. The angle formed by measurement light of the three-dimensional laser scanner being less than a threshold value is synonymous with being visible within a predetermined vicinity from a distance measurement viewpoint and, with a three-dimensional laser scanner that rotates about the two axes of a pan angle and a tilt angle, for example, is defined as being close in terms of the pan angle and the tilt angle (that is, both the pan angle and the tilt angle are less than the threshold value).

The functional configuration of the camera parameter calculation apparatus according to modified example 6 is substantially the same as that of the camera parameter calculation apparatus 101 described in the embodiments, and therefore a description thereof has been omitted.

Figure 26:
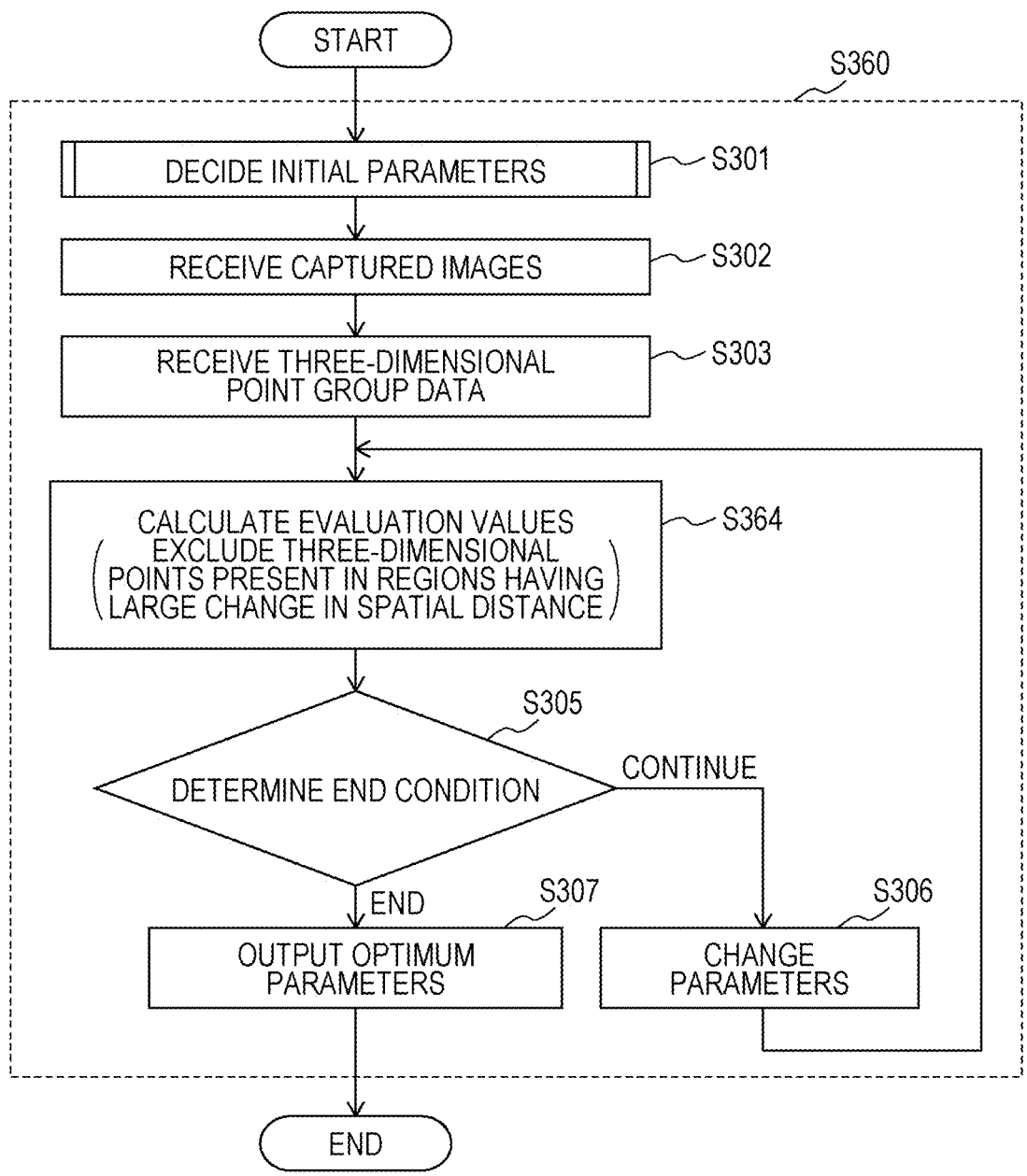
FIG. 26 is a flowchart depicting an example of a camera parameter calculation process according to modified example 6.

FIG. 26 is a flowchart depicting an example of a camera parameter calculation process S360. In FIG. 26, the same steps as in the embodiments are denoted by the same step names as in FIG. 2, and descriptions thereof have been omitted. In step S364, a region having a large change in spatial distance is excluded from the three-dimensional point group data acquired in step S303. The determining of this region having a large change in spatial distance will be described.

The three-dimensional laser scanner causes a laser radiation port to rotate about rotation axes, and obtains three-dimensional point group data at certain angle intervals. To simplify the description, it is assumed that the center of rotation of the three-dimensional laser scanner is the point of origin, and that the laser radiation port rotates about the two rotation axes of a pan angle and a tilt angle centered about the point of origin. The distance between two three-dimensional points with which the pan angle and the tilt angle are close is approximated by the difference between depth values measured by the three-dimensional laser scanner, for example. A region including sets of points in which the largest value for the distance between two three-dimensional points with which the pan angle and the tilt angle are close is greater than a threshold value is determined as a region having a large change in spatial distance. According to this determination, evaluation values J are calculated excluding three-dimensional point groups that are present in a region having a large change in spatial distance. According to this exclusion, the general form of the function for the evaluation values J becomes smooth and minimization of the evaluation values J is facilitated.

As mentioned above, by excluding three-dimensional point group data of regions having a large spatial change, camera calibration can be carried out without being affected by three-dimensional point group data that is present in boundaries between objects or surfaces having considerable unevenness.

Modified Example 7

In the embodiments, examples were given in which three-dimensional point group data to be used for evaluation is selected based on pixel values, covered regions, or spatial changes in the distance between two points of a three-dimensional point group with which the pan angle and the tilt angle of the three-dimensional laser scanner are close; however, it is not necessary for there to be any restriction thereto. In modified example 7, the case where three-dimensional point group data is selected based on intensity values will be described. The functional configuration of the camera parameter calculation apparatus according to modified example 7 is substantially the same as that of the camera parameter calculation apparatus 101 described in the embodiments, and therefore a description thereof has been omitted.

Figure 27:
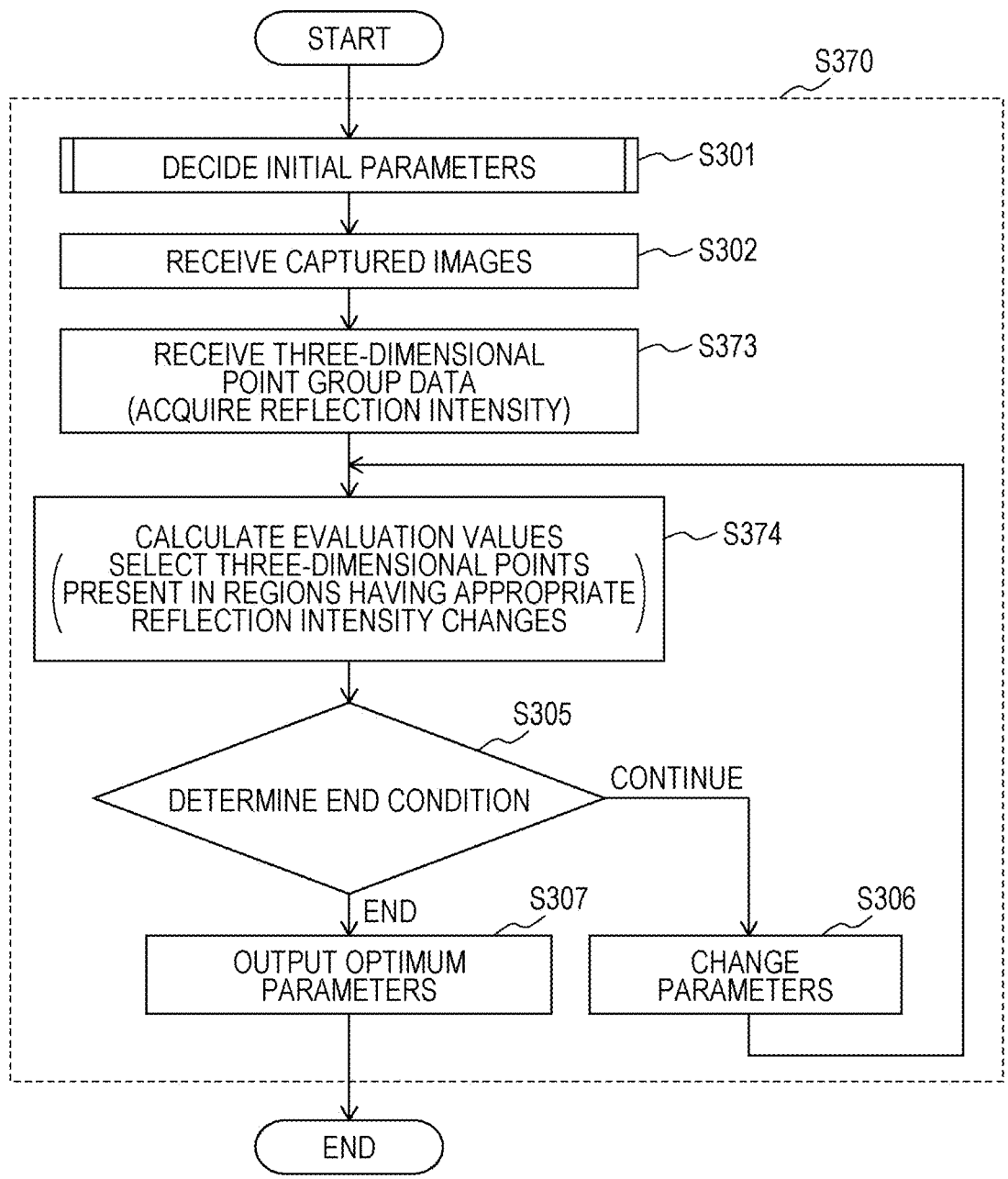
FIG. 27 is a flowchart depicting an example of a camera parameter calculation process according to modified example 7.

FIG. 27 is a flowchart depicting an example of a camera parameter calculation process S370. In FIG. 27, the same steps as in the embodiments are denoted by the same step names as in FIG. 2, and descriptions thereof have been omitted. In step S374, three-dimensional point group data is selected based on intensity values, from three-dimensional point group data including intensity values acquired in step S373. The selection method will be described hereinafter.

The three-dimensional laser scanner radiates a laser onto an object, and the depth of the object is calculated based on reflected light received therefrom. It is therefore possible to acquire intensity values (received light intensity or object reflectance) that are associated with three-dimensional point group data. The intensity values change according to the shape and material of the object surface, and there is a correlation with the color of the object surface. This correlation will be described hereinafter. White and black objects that do not emit light themselves in the visible light region respectively correspond to the case where light reflectance is high and the case where light reflectance is low. Therefore, the reflection characteristics of an object with respect to visible or near-infrared laser light are close to the reflection characteristics of visible light. Consequently, there is a correlation between the color of an object surface and the intensity values.

In a three-dimensional laser scanner that rotates about the two axes of a pan angle and a tilt angle similar to that described in modified example 6, sets of three-dimensional points in which the difference between the intensity values of any two points of a three-dimensional point group that are close in terms of the pan angle and the tilt angle (that is, visible within a predetermined vicinity from the distance measurement viewpoint) is less than a first threshold value or is greater than a second threshold value are excluded from the three-dimensional point group data acquired in S303. According to this exclusion, three-dimensional point groups in which the difference between intensity values is small and the evaluation values J do not change, and three-dimensional point groups in which the difference between intensity values is large and the change in the evaluation values J is large are excluded from the calculation of the evaluation values, and therefore the general form of the function for the evaluation values J becomes smooth and minimization of the evaluation values J is facilitated.

As mentioned above, by excluding three-dimensional point group data in which the difference between intensity values is large, camera calibration can be carried out without being affected by three-dimensional point group data that is present on an object surface having a large change in color.

Modified Example 8

In the embodiments, examples were given in which three-dimensional point group data to be used for evaluation is selected based on pixel values, covered regions, spatial changes in the distance between two points of a three-dimensional point group with which the pan angle and the tilt angle of the three-dimensional laser scanner are close, or intensity values; however, it is not necessary for there to be any restriction thereto. In modified example 8, the case where three-dimensional point group data is selected based on color information of a three-dimensional point group will be described.

The functional configuration of the camera parameter calculation apparatus according to modified example 8 is substantially the same as that of the camera parameter calculation apparatus 101 described in the embodiments, and therefore a description thereof has been omitted.

Figure 28:
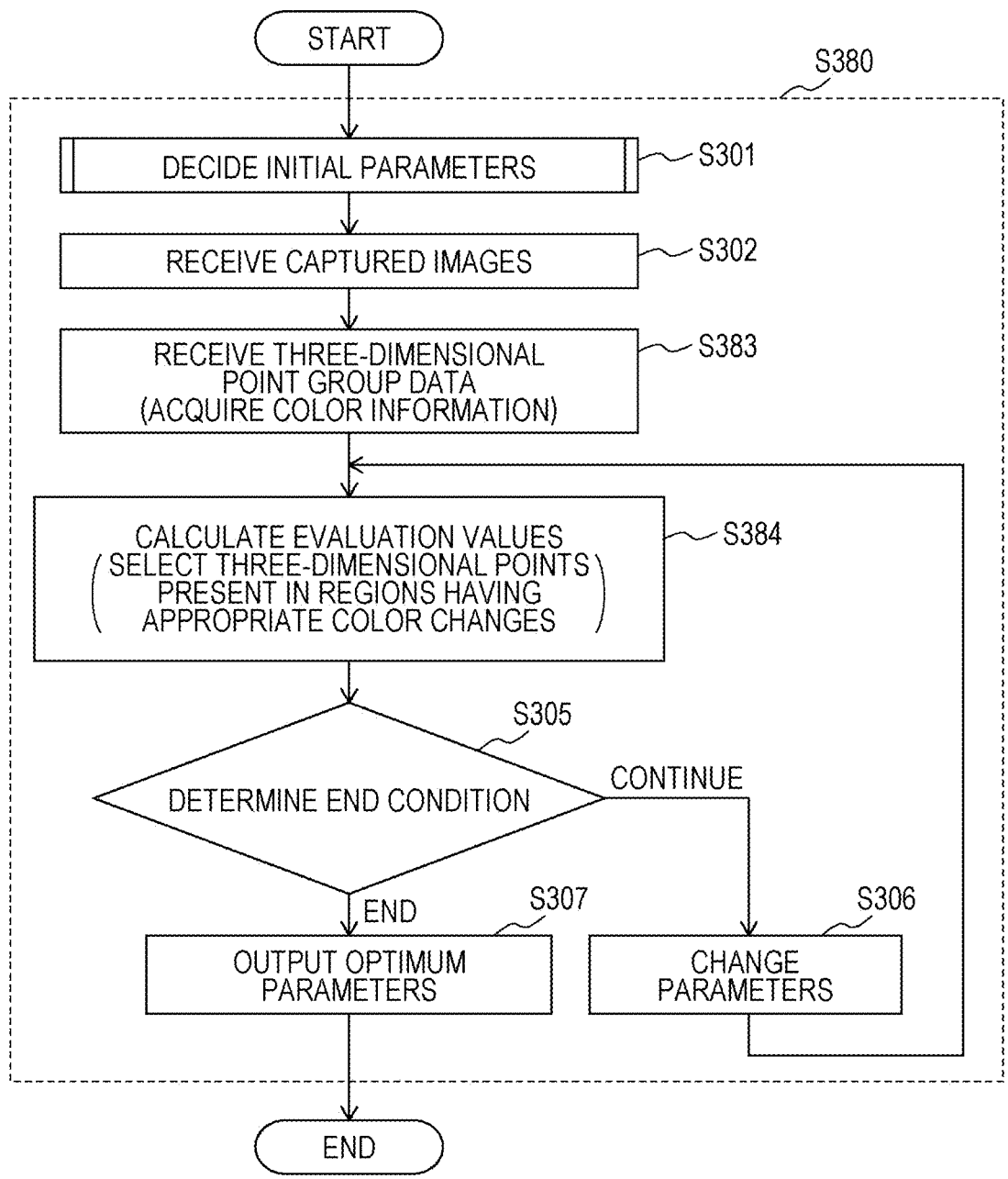
FIG. 28 is a flowchart depicting an example of a camera parameter calculation process according to modified example 8.

FIG. 28 is a flowchart depicting an example of a camera parameter calculation process S380. In FIG. 28, the same steps as in the embodiments are denoted by the same step names as in FIG. 2, and descriptions thereof have been omitted. In step S384, three-dimensional point group data is selected based on color information of a three-dimensional point group, from three-dimensional point group data including color information acquired in step S383. The selection method will be described hereinafter.

Color information (for example, RGB values or luminance values) associated with three-dimensional point group data can be acquired in the case where visible light imaging is possible at the same axis as the laser radiation axis of the three-dimensional laser scanner. In a three-dimensional laser scanner that rotates about the two axes of a pan angle and a tilt angle similar to that described in modified example 6, sets of three-dimensional points in which the difference between color information (for example, RGB values or luminance values) of any two points of a three-dimensional point group that are close in terms of the pan angle and the tilt angle (that is, visible within a predetermined vicinity from the distance measurement viewpoint) is less than a first threshold value or is greater than a second threshold value are excluded from the three-dimensional point group data acquired in S383. According to this exclusion, three-dimensional point groups in which the difference between color information values is small and the evaluation values J do not change, and three-dimensional point groups in which the difference between color information is large and the change in the evaluation values J is large are excluded from the calculation of the evaluation values, and therefore the general form of the function for the evaluation values J becomes smooth and minimization of the evaluation values J is facilitated.

As mentioned above, by excluding three-dimensional point group data in which the difference in color information is large, camera calibration can be carried out without being affected by three-dimensional point group data that is present on an object surface having a large change in color.

Modified Example 9

In the embodiments, camera calibration using a multi-lens camera and a three-dimensional laser scanner was described;

however, in the case where the three-dimensional laser scanner is able to acquire color information as described in modified example 8, a camera can be calibrated with one camera and the three-dimensional laser scanner. In modified example 9, camera calibration by means of one camera and a three-dimensional laser scanner will be described.

Figure 29:
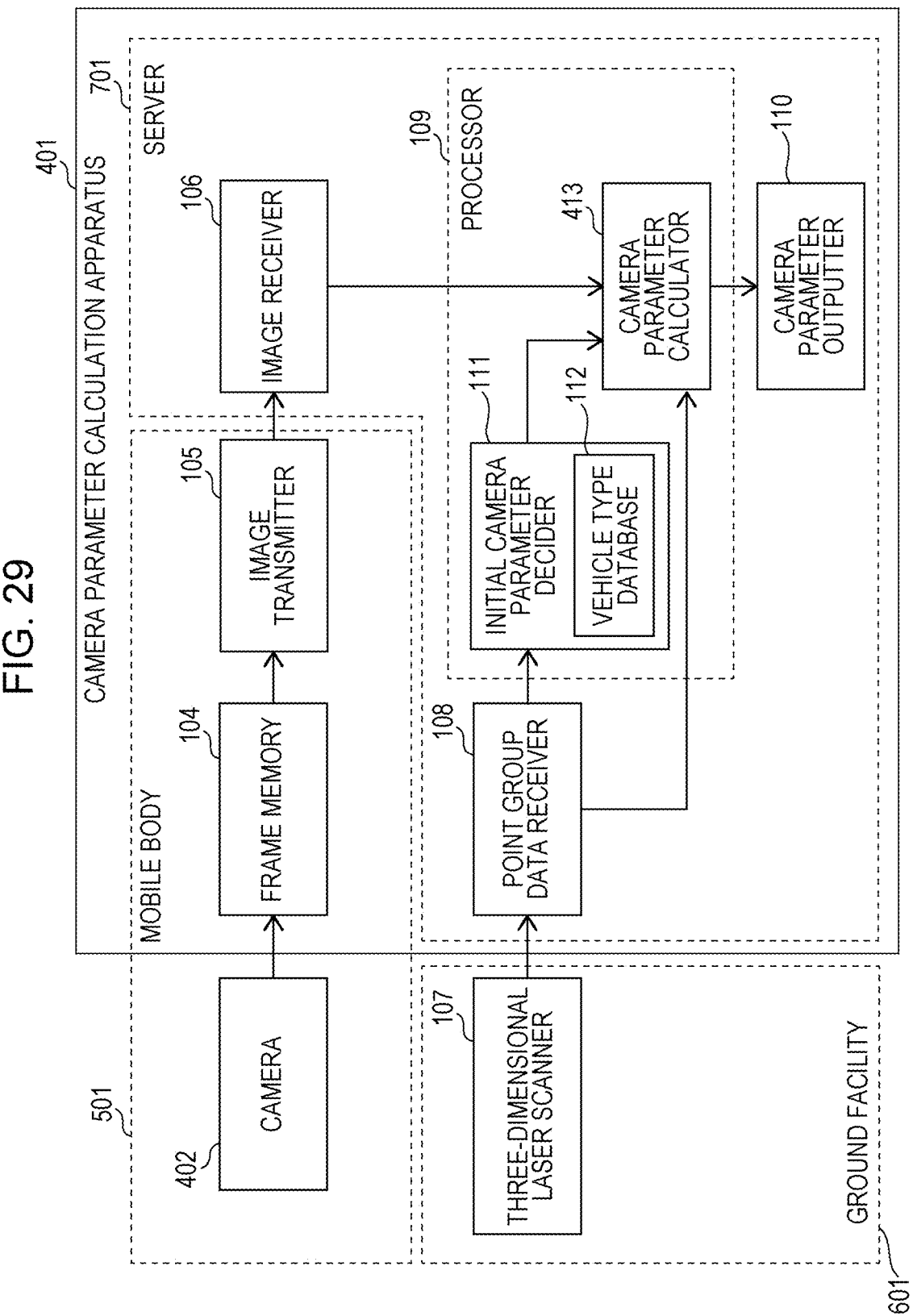
FIG. 29 is a block diagram depicting an example of the functional configuration of a camera parameter calculation apparatus according to modified example 9.

FIG. 29 is a block diagram of a camera parameter calculation apparatus 401. In FIG. 29, the same constituent elements as in the embodiments are denoted by the same reference characters as in FIG. 1, and descriptions thereof have been omitted. Compared to the camera parameter calculation apparatus 101 of embodiment 1, the camera parameter calculation apparatus 401 is different in that there is one camera 402 to be corrected, and in that the evaluation function used for the camera parameter calculation process in a camera parameter calculator 413 is different.

Figure 30:
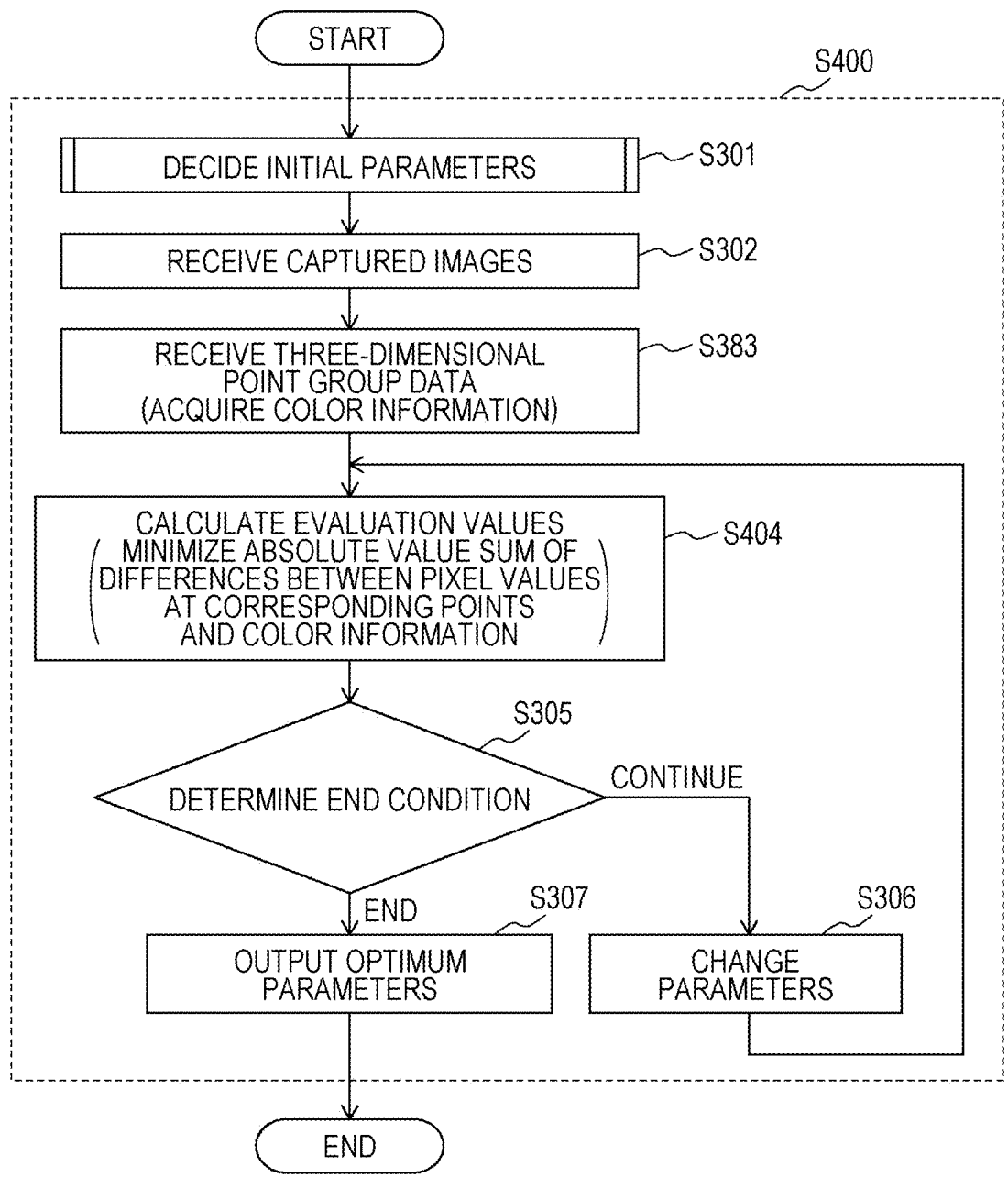
FIG. 30 is a flowchart depicting an example of a camera parameter calculation process according to modified example 9.

FIG. 30 is a flowchart depicting a parameter calculation operation of a camera parameter calculation process S400 according to modified example 9. In FIG. 30, the same steps as in the embodiments and modified example 8 are denoted by the same step names as in FIG. 28, and descriptions thereof have been omitted. Color information obtained by imaging at the same axis as that of the three-dimensional laser scanner is added to the three-dimensional point group data acquired in step S383. Expression 14 indicates the evaluation function J used in the evaluation value calculation of step S404.

$$J = \frac{1}{N}\sum_{k=1}^{N}|I(x_k, y_k) - A_k|$$ (Expression 14)

Here, $A_k$ represents the color information of a three-dimensional point used for calculating the $k^{th}$ image coordinate pair of a camera. The color information is made to be the same color information as the pixel values of the camera. For example, in the case where the pixel values of the camera are RGB values, RGB values are used for the color information of $A_k$. The other variables are the same as the variables included in expression 3, and therefore a description thereof has been omitted.

As mentioned above, in the camera parameter calculation process S400 of modified example 9, camera calibration can be carried out by means of one camera and a three-dimensional laser scanner by using the color information of three-dimensional points.

It should be noted that the absolute value sum of the differences between pixel values and color information of expression 14 may be a square sum of the differences. Furthermore, two or more cameras may be used.

Modified Example 10

In modified example 10, camera parameters are calculated excluding regions in which an image luminance gradient is not present or is sufficiently small, and the calculation amount is thereby reduced with calculations for regions having little contribution to evaluation values being omitted.

The aforementioned is based on the following approach. More specifically, in the case where the luminance gradient is 0 around the pixels of two camera images to which a certain three-dimensional point corresponds, the luminance difference between the two pixels with respect to this three-dimensional point is mostly fixed even if the camera parameters are changed slightly. In other words, there is no effect on the calculation of camera parameters for minimizing the evaluation values J. Thus, the calculation amount can be reduced by excluding such three-dimensional points from the calculation of the evaluation values J.

In modified example 10, the operation of the camera parameter calculator 113 for calculating the camera parameters is different compared to the embodiments. The functional configuration of the camera parameter calculation apparatus 101 according to modified example 10 is substantially the same as that of the camera parameter calculation apparatus 101 described in the embodiments, and therefore a description thereof has been omitted.

Figure 31:
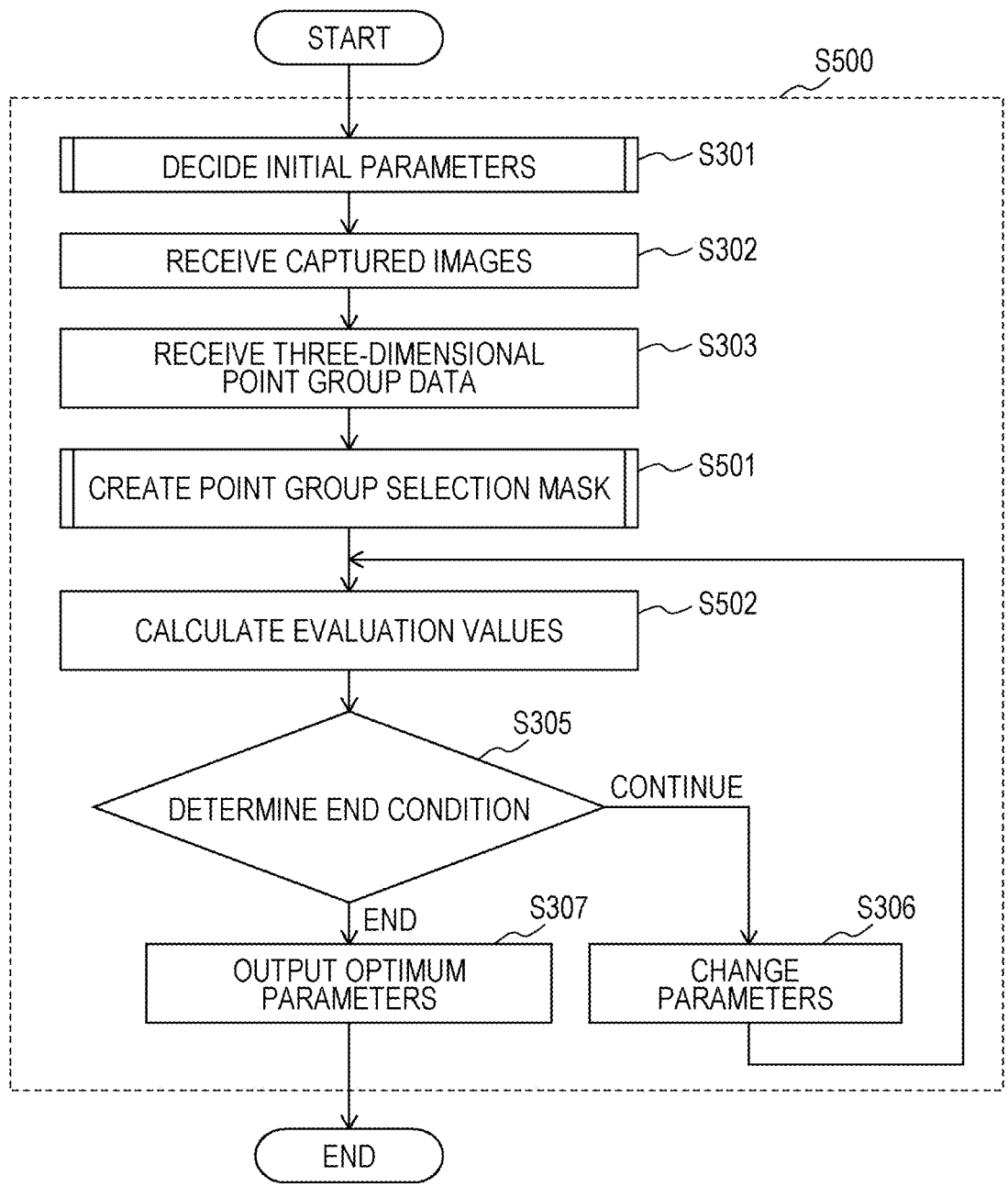
FIG. 31 is a flowchart depicting an example of a camera parameter calculation process according to modified example 10.

FIG. 31 is a flowchart depicting an example of a camera parameter calculation process S500 according to modified example 10. In FIG. 31, the same steps as in the embodiments are denoted by the same step names as in FIG. 2, and descriptions thereof have been omitted.

In step S501 of FIG. 31, the camera parameter calculator 113 creates a point group selection mask for determining whether or not each of N number of three-dimensional points acquired in step S303 is to be used for the calculation of evaluation values, on the basis of a luminance gradient of a camera image acquired in step S301. With respect to each pixel in the camera image, the point group selection mask takes a binary value indicating whether the pixel in question is a valid pixel that is to be used for calculating evaluation values or an invalid pixel where the luminance value of the pixel is not to be used for calculating evaluation values. The point group selection mask is created for individual camera images captured by one or more cameras.

Figure 32:
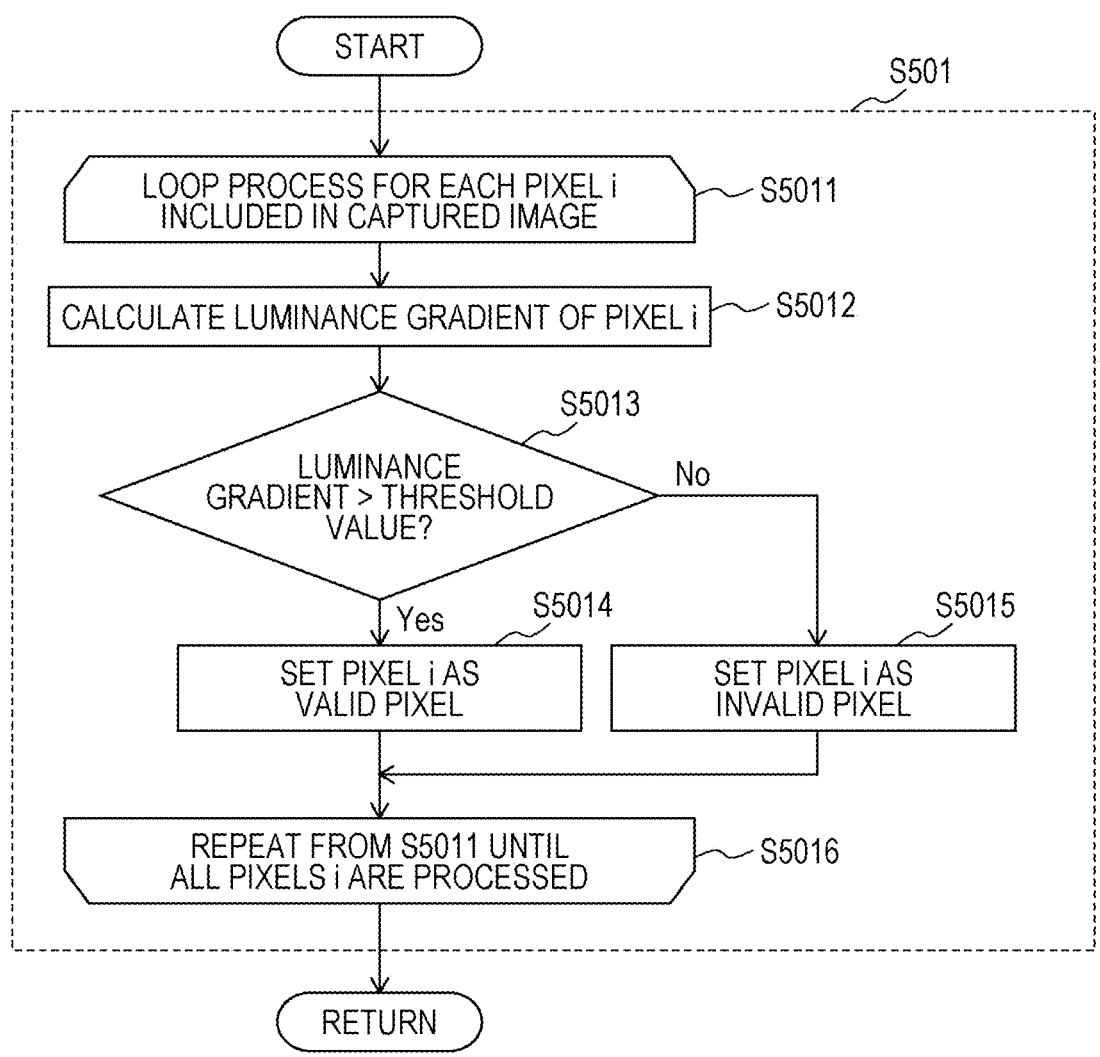
FIG. 32 is a flowchart depicting an example of a point group selection mask creation process according to modified example 11.

FIG. 32 is a flowchart depicting a detailed example of a point group selection mask creation process S501.

In the point group selection mask creation process S501, a pixel index is taken as i, and loop processing is carried out in which the pixels i in the camera image are sequentially selected and it is specified whether the selected pixel i is a valid pixel or an invalid pixel (S5011 to S5016).

A luminance gradient $G_i$ of the pixel i is calculated from neighboring pixels centered about the pixel i (S5012). As an example of the luminance gradient, the luminance gradient $G_i$ according to neighboring pixels centered about the pixel i is indicated in expression 15.

$$G_i = \sqrt{f_x(x_i,y_i)^2 + f_y(x_i,y_i)^2}$$

$$f_x(x_i,y_i) = I(x_i+1,y_i) - I(x_i-1,y_i)$$

$$f_x(x_i,y_i) = I(x_i,y_i+1) - I(x_i,y_i+1)$$ (Expression 15)

Here, I(x, y) is a luminance value at an image coordinate pair (x, y).

A threshold value is compared with the luminance gradient $G_i$ (S5013), and in the case where the luminance gradient $G_i$ is greater than the threshold value, the pixel i is set as a valid pixel in the point group selection mask (S5014). Furthermore, in the case where the luminance gradient $G_i$ is equal to or less than the threshold value, the pixel i is set as an invalid pixel in the point group selection mask (S5015). The threshold value, as an example, may be a constant multiple of the average luminance gradient of the entire image.

Once again referring to FIG. 31, in step S502, the camera parameter calculator 113 calculates the evaluation function J (for example, expression 3) using the three-dimensional coordinate sets selected based on the point group selection mask created in step S501, from within the three-dimensional point group data acquired in step S303.

In the example of a stereo camera, in the case where a pixel located at a corresponding point of a certain three-dimensional point is indicated as an invalid pixel by the point group selection mask in at least one of the left/right camera images, the pixel value in the camera image corresponding to the three-dimensional point may be excluded from the calculation of the evaluation function.

Furthermore, in the case where a pixel located at a corresponding point of a certain three-dimensional point is indicated as an invalid pixel by the point group selection mask in both of the left/right camera images, the pixel value in the camera image corresponding to the three-dimensional point may be excluded from the calculation of the evaluation function.

As mentioned above, from within the three-dimensional point group data, three-dimensional points having a small luminance gradient at corresponding points of camera images are excluded from the calculation of the evaluation function J, and camera calibration can thereby be carried out with the calculation amount being reduced.

It should be noted it is not necessary for the evaluation function J to be restricted to expression 3, and expressions 4 to 14 may be used. Furthermore, the point group selection mask does not have to indicate valid pixels or invalid pixels with respect to all of the pixels of each camera image, and may indicate valid pixels or invalid pixels with respect to neighboring pixels of corresponding points of each three-dimensional point.

Other Modified Examples

Heretofore, the camera parameter calculation apparatus according to one or more aspects of the present disclosure has been described based on embodiments and modified examples; however, the present disclosure is not restricted to these embodiments and modified examples. Modes in which various other modifications conceived by a person skilled in the art have been implemented in the present embodiments, and modes constructed by combining the constituent elements in different embodiments may also be included within the scope of the one or more aspects of the present disclosure provided they do not depart from the purpose of the present disclosure.

The camera parameter calculation apparatus of the present disclosure is useful as a camera parameter calculation apparatus for calibrating various types of cameras without using a calibration index having a known three-dimensional structure.

What is claimed is:

1. A camera parameter calculation method, comprising:
   (a1) receiving three-dimensional point group data indicating three-dimensional coordinate sets of three-dimensional points included in a common imaging space of one or more cameras installed on a mobile body;
   (a2) transmitting one or more images captured by the one or more cameras;
   (a3) receiving the one or more images transmitted in process (a2);
   (a4) deciding one or more initial camera parameters of the one or more cameras, on the basis of one or more mounting locations and one or more directions of the one or more cameras;
   (a5) calculating corresponding points in the one or more images received in process (a3), for the three-dimensional points, on the basis of the three-dimensional point group data received in process (a1) and the one or more initial camera parameters decided in process (a4);
   (a6) calculating one or more camera parameters of the one or more cameras, on the basis of pixel values at the corresponding points calculated in process (a5), in the one or more images; and
   (a7) outputting the one or more camera parameters calculated in process (a6) for use in calibrating the one or more cameras,
   the one or more cameras having a one-to-one relationship with the one or more initial camera parameters, the one or more cameras having a one-to-one relationship with the one or more images, and the one or more cameras having a one-to-one relationship with the one or more camera parameters, and
   a processor executing at least one of processes (a1) to (a7).

2. The camera parameter calculation method according to claim 1,
   wherein, in process (a5), the three-dimensional coordinate sets are converted into image coordinate pairs of the corresponding points in the one or more images corresponding to the one or more cameras, on the basis of the one or more initial camera parameters corresponding to the one or more cameras.

3. The camera parameter calculation method according to claim 1,
   wherein the one or more cameras include two cameras,
   in process (a6), the one or more camera parameters are calculated on the basis of differences, and
   each of the differences is a difference between:
   a pixel value at a corresponding point in a first image captured by a first camera included in the two cameras, for one three-dimensional point from among the three-dimensional points; and
   a pixel value at a corresponding point in a second image captured by a second camera included in the two cameras, for the one three-dimensional point.

4. The camera parameter calculation method according to claim 1,
   wherein the one or more cameras are two or more cameras,
   in process (a6), the one or more camera parameters are calculated on the basis of differences, and
   each of the differences is a difference between:
   one pixel value from among pixel values at corresponding points in individual images captured by the two or more cameras, for one three-dimensional point from among the three-dimensional points; and
   an average value for the pixel values.

5. The camera parameter calculation method according to claim 1,
   wherein the one or more cameras are two or more cameras, and,
   in process (a6), the one or more camera parameters are calculated on the basis of a degree of similarity between pixel value patterns in neighboring pixels of corresponding points in individual images, corresponding to the same three-dimensional point.

6. The camera parameter calculation method according to claim 5,
   wherein, in process (a6), the one or more camera parameters are calculated on the basis of normalized cross-correlations, and each of the normalized cross-correlations is a correlation of pixel values included in a vicinity of corresponding points in the individual images captured by the two or more cameras, for one three-dimensional point from among the three-dimensional points.

7. The camera parameter calculation method according to claim 1,
wherein, in process (a6), three-dimensional points at which corresponding points having a distance of separation that is equal to or less than a threshold value are obtained in at least any one image, from among the three-dimensional points, are excluded from calculation of the one or more camera parameters.

8. The camera parameter calculation method according to claim 1,
wherein, in process (a6), the one or more camera parameters are calculated from three-dimensional points having excluded therefrom one or more three-dimensional points at which a luminance gradient at a corresponding point in at least one image from among the one or more images is less than a threshold value, from among the three-dimensional points.

9. The camera parameter calculation method according to claim 1,
wherein the three-dimensional point group data indicates three-dimensional locations of the three-dimensional points, based on reflection of measurement light emitted from a predetermined distance measurement viewpoint, and,
in process (a6), two three-dimensional points, included in the three-dimensional points, with which a distance between the two three-dimensional points is greater than a threshold value and an angle formed by a direction vector of the measurement light toward the two three-dimensional points is less than a threshold value are excluded from calculation of the one or more camera parameters.

10. The camera parameter calculation method according to claim 1,
wherein the three-dimensional point group data indicates three-dimensional locations of the three-dimensional points and intensity values of return light of measurement light from each three-dimensional point, based on reflection of the measurement light emitted from a predetermined distance measurement viewpoint, and,
in process (a6), the one or more camera parameters are calculated using three-dimensional points that are visible within a predetermined vicinity from the distance measurement viewpoint and have a difference between the intensity values that is within a range decided using a first threshold value and a second threshold value, from among the three-dimensional points.

11. The camera parameter calculation method according to claim 1,
wherein the three-dimensional point group data is data obtained by measuring distances of the three-dimensional points using a three-dimensional laser scanner.

12. The camera parameter calculation method according to claim 1,
wherein the three-dimensional point group data indicates three-dimensional locations of the three-dimensional points and a color of an object at each three-dimensional point, based on reflection of measurement light emitted from a predetermined distance measurement viewpoint and color imaging from the distance measurement viewpoint, and,
in process (a6), the one or more camera parameters are calculated using three-dimensional points that are visible within a predetermined vicinity from the distance measurement viewpoint and have a difference between the colors of the objects that is within a range decided using a first threshold value and a second threshold value, from among the three-dimensional points.

13. The camera parameter calculation method according to claim 12,
wherein, in process (a1), the three-dimensional point group data is received from a three-dimensional laser scanner provided with a color camera that color-images a distance measurement space.

14. The camera parameter calculation method according to claim 1,
wherein, in process (a5), both a first corresponding point in a first image captured by a first camera and a second corresponding point in a second image captured by a second camera being calculated using a first three-dimensional coordinate set of a first three-dimensional point, the corresponding points including the first corresponding point, the one or more images including the first image and second image, the one or more cameras including the first camera and the second camera, the three-dimensional coordinate sets including the first three-dimensional coordinate set, the three-dimensional points including the first three-dimensional point.

15. A camera parameter calculation method, comprising:
(a1) receiving three-dimensional point group data indicating three-dimensional coordinate sets of three-dimensional points included in a common imaging space of one or more cameras installed on a mobile body;
(a2) transmitting one or more images captured by the one or more cameras;
(a3) receiving the one or more images transmitted in process (a2);
(a4) deciding one or more initial camera parameters of the one or more cameras, on the basis of one or more mounting locations and one or more directions of the one or more cameras;
(a5) calculating corresponding points in the one or more images received in process (a3), for the three-dimensional points, on the basis of the three-dimensional point group data received in process (a1) and the one or more initial camera parameters decided in process (a4);
(a6) calculating one or more camera parameters of the one or more cameras, on the basis of pixel values at the corresponding points calculated in process (a5), in the one or more images; and
(a7) outputting the one or more camera parameters calculated in process (a6) for use in calibrating the one or more cameras,
the one or more cameras having a one-to-one relationship with the one or more initial camera parameters, the one or more cameras having a one-to-one relationship with the one or more images, and the one or more cameras having a one-to-one relationship with the one or more camera parameters, and
a processor executing at least one of processes (a1) to (a7)
wherein the three-dimensional point group data indicates three-dimensional locations of the three-dimensional points and a color of an object at each three-dimensional point, based on reflection of measurement light emitted from a predetermined distance measurement viewpoint and color imaging from the distance measurement viewpoint,
each of the one or more cameras is a color camera, and,
in process (a6), a camera parameter of one camera from among the one or more cameras is calculated on the basis of differences, and
each of the differences is a difference between:

a color indicated by a pixel value at a corresponding point in an image captured by the one camera, for one three-dimensional point from among the three-dimensional points; and the color of the object at the one three-dimensional point indicated by the three-dimensional point group data.

16. A camera parameter calculation apparatus, comprising:

a processing circuit that calculates a camera parameter of a camera installed on a mobile body, the processing circuit:

(a1) receiving three-dimensional point group data indicating three-dimensional coordinate sets of three-dimensional points included in a common imaging space of one or more cameras;

(a2) transmitting one or more images captured by the one or more cameras;

(a3) receiving the one or more images transmitted in process (a2);

(a4) deciding one or more initial camera parameters of the one or more cameras, on the basis of one or more mounting locations and one or more directions of the one or more cameras;

(a5) calculating corresponding points in the one or more images received in process (a3), for the three-dimensional points, on the basis of the three-dimensional point group data received in process (a1) and the one or more initial camera parameters decided in process (a4);

(a6) calculating one or more camera parameters of the one or more cameras, on the basis of pixel values at the corresponding points calculated in process (a5), in the one or more images; and (a7) outputting the one or more camera parameters calculated in process (a6) for use in calibrating the one or more cameras, and the one or more cameras having a one-to-one relationship with the one or more initial camera parameters, the one or more cameras having a one-to-one relationship with the one or more images, and the one or more cameras having a one-to-one relationship with the one or more camera parameters.

17. The camera parameter calculation apparatus according to claim 16, wherein, in feature (a5), both a first corresponding point in a first image captured by a first camera and a second corresponding point in a second image captured by a second camera being calculated using a first three-dimensional coordinate set of a first three-dimensional point, the corresponding points including the first corresponding point, the one or more images including the first image and second image, the one or more cameras including the first camera and the second camera, the three-dimensional coordinate sets including the first three-dimensional coordinate set, the three-dimensional points including the first three-dimensional point.

* * * * *